US008009725B2

(12) United States Patent
Petrovic et al.

(10) Patent No.: US 8,009,725 B2

(45) Date of Patent: Aug. 30, 2011

(54) TRANSLATIONAL SWITCHING SYSTEM AND SIGNAL DISTRIBUTION SYSTEM EMPLOYING SAME

(75) Inventors: Branislav Petrovic, San Diego, CA (US); Keith Bargroff, San Diego, CA (US); Jeremy Goldblatt, San Diego, CA (US)

(73) Assignee: RF Magic, Inc., San Diego, CA (US)

( * ) Notice: Subject to any disclaimer, the term of this patent is extended or adjusted under 35 U.S.C. 154(b) by 646 days.

(21) Appl. No.: 12/015,774

(22) Filed: Jan. 17, 2008

(65) Prior Publication Data

US 2008/0174384 A1 Jul. 24, 2008

Related U.S. Application Data

(60) Provisional application No. 60/885,814, filed on Jan. 19, 2007, provisional application No. 60/886,933, filed on Jan. 28, 2007.

(51) Int. Cl.
*H04B 1/38* (2006.01)

(52) U.S. Cl. ........ 375/220; 375/316; 375/222; 375/328; 375/350

(58) Field of Classification Search .................. 375/316, 375/220, 222, 328, 350
See application file for complete search history.

(56) References Cited

U.S. PATENT DOCUMENTS

| | | | | |
|---|---|---|---|---|
| 5,073,930 | A | 12/1991 | Green | |
| 5,276,904 | A | 1/1994 | Mutzig et al. | |
| 5,959,592 | A | 9/1999 | Petruzzelli | |
| 6,424,817 | B1 | 7/2002 | Hadden et al. | |
| 6,600,730 | B1 | 7/2003 | Davis et al. | |
| 7,130,576 | B1 | 10/2006 | Gurantz et al. | |
| 7,225,282 | B1 * | 5/2007 | Lyle | 710/105 |
| 2004/0029549 | A1 | 2/2004 | Fikart | |
| 2004/0209584 | A1 | 10/2004 | Bargroff | |
| 2004/0235415 | A1 | 11/2004 | Atarashi | |

FOREIGN PATENT DOCUMENTS

| | | | |
|---|---|---|---|
| EP | 0 80 314 | * | 10/1997 |
| EP | 1 089 469 | * | 4/2001 |
| WO | WO 02/51015 | * | 6/2002 |
| WO | 2005109703 | A | 11/2005 |
| WO | 2006119397 | A | 11/2006 |

OTHER PUBLICATIONS

Courtesy of the International Search Report from PCT application PCT/US2007/089192.*

* cited by examiner

*Primary Examiner* — Kabir A Timory

(74) *Attorney, Agent, or Firm* — Clifford Perry; Bruce W. Greenhaus

(57) ABSTRACT

A translational switch system includes first and second translational switches, and a signal bus coupled therebetween. The first translational switch includes one or more inputs configured to receive a respective one or more first input signals, a first plurality of outputs, and a second plurality of outputs. The second translational switch includes one or more inputs configured to receive a respective one or more second input signals, a first output, and a second output. The signal bus, coupled between the first and second translational switches, includes (i) a first bus line coupled to a first one of the first plurality of outputs of the first translational switch, and to the first output of the second translational switch, and (ii) a second bus line coupled to a first one of the second plurality of outputs of the first translational switch, and to the second output of the second translational switch.

24 Claims, 17 Drawing Sheets

TRANSLATIONAL SWITCHING SYSTEM AND SIGNAL DISTRIBUTION SYSTEM EMPLOYING SAME

CROSS REFERENCE TO RELATED APPLICATIONS

This application claims the benefit of priority of each of the following applications, and incorporates by reference the contents of each of the following applications for all purposes:

U.S. Provisional Application No. 60/885,814, filed Jan. 19, 2007, entitled "Circuits, Systems and Methods for Constructing a Composite Signal;" and U.S. Provisional Application No. 60/886,933, filed Jan. 28, 2007, entitled "Circuits, Systems and Methods for Frequency Translation and Signal Distribution."

BACKGROUND

The present invention relates to circuits and systems for processing signals, and particularly with circuits and systems for constructing composite signals.

Composite signals are formed by assembling two or more signals into a combined signal spectrum, and find utility in many applications. For example, systems used to distribute satellite television signals often employ means to construct composite signals, whereby various channels or bands of channels originating from several different satellites are assembled into a composite signal over which a user's set top box or other receiver can tune. Switch matrices are often used in such systems, whereby a particular input signal (e.g., a Ku or Ka-band satellite signal) is supplied to an input of a switch matrix, and the switch matrix controlled so as to provide that signal to one or more of the switch matrix outputs. Two or more of such signals, each typically representing a different signal spectrum (i.e., containing different channels, or bands of channels) are combined (using, e.g., a diplexer or signal combiner network) and possibly frequency-translated to a second frequency (e.g., upper and lower L-band frequencies, 950 MHz-1450 MHz and 1650 MHz-2150 MHz), the combination of the two signals representing a composite signal that is supplied to a user for demodulation and/or baseband processing.

FIG. 1 illustrates a conventional satellite television distribution system operable to construct and distribute a composite signal. The system is configured to receive signals from two satellite signal sources and to output two composite signals, each composite signal typically including a portion of each of the two satellite signals, and each composite signal supplied to a dual channel tuner (or two individual tuners). Each antenna receives two signals of different polarizations, typically having channel frequencies offset by half-channel width or having the same channel frequencies. In direct broadcast satellite (DBS) applications, the polarization is typically circular, having right-hand (R1 and R2) and left-hand (L1 and L2) polarized signals as labeled in FIG. 1. Signals can also be linearly polarized with horizontal and vertical polarizations.

The received signals are processed in a low noise block-converter 108 consisting of low noise amplifiers 107 (typically 2 or 3 amplifiers in a cascade), filters 109 (typically bandpass filters providing image rejection and reducing out of band power) and frequency converter block 110. The converter block 110, performing frequency down conversion, contains local oscillators LO1 114 and LO2 112 typically of the DRO (dielectric-resonator oscillator) types, mixers and post-mixer amplifiers. The two mixers driven by LO1 down convert the signals to one frequency band (lower—L) while the mixers driven by LO2 down convert to a different frequency band (higher—H). The L and H bands are mutually exclusive, do not overlap and have a frequency guard-band in between. The L and H band signals are then summed together in a separate combiner 116 in each arm, forming a composite signal having both frequency bands ("L+H", which is often referred to as a "band-stacked signal" when the added signal components are bands of channels, or a "channel-stacked signal" when the added signal components are individual channels) which is then coupled to a 2×4 switch matrix/converter block 120.

The switch matrix 130 routes each of the two input signals to selected one or more of the 4 outputs, either by first frequency converting the signals in the mixers 128 driven by LO3 132 or directly via the bypass switches around the mixers (the controls for the switch and mixer bypass not shown in the figure). The frequency of the LO3 is chosen such that the L-band converts into the H band, and vice versa, which is referred to as the "band-translation." This is accomplished when the LO3 frequency is equal to the difference of the LO2 and LO1 frequencies.

The outputs of the matrix switch/converter block 120 are coupled through diplexers consisting of a high-pass filter 122, low-pass filter 124 and a combiner 126 (as shown in the upper arm, the lower arm being the same) providing two dual tuner outputs 118 and 134. The filters 122 and 124 remove the undesired portion of the spectrum, i.e. the unwanted bands in each output. Each of the two outputs 118 and 134 feeds via a separate coaxial cable a dual tuner, for a total capability of four tuners. By controlling the matrix switch routing and the mixer conversion/bypass modes, a frequency translation is accomplished and each of the four tuners can independently tune to any of the channels from either polarization of either satellite.

While operational, the conventional system suffers from some disadvantages, one of which is the relatively low source-to-source isolation the system exhibits. In particular, the low noise converter block 108 and the switch matrix converter block 120 each may exhibit low isolation between their respective signal paths, which may lead to cross-coupling of the signals, and contamination of the composite signal with unwanted signal content. This cross-coupling effect becomes especially acute when the sources operate at high frequencies and over the same band, conditions which exist in the aforementioned satellite TV distribution system, whereby both satellite sources operate over the same Ku or Ka-band.

Another disadvantage of the conventional system is that multiple frequency translations are needed to provide the desired composite output signal. In particular, the low noise block converter 108 provides a first frequency translation, e.g., to down convert the received satellite signal from Ku-band to L-band, and the switch matrix/converter 120 provides a second frequency translation, e.g., to translate the down converted signal from a lower band to an upper band, or visa versa. Multiple frequency conversions increase the system's complexity, cost, and power consumption, as well as degrade signal quality.

SUMMARY

As one embodiment of the present invention, a translational switch system is presented and includes first and second translational switches, and a signal bus coupled therebetween. The first translational switch includes one or more inputs configured to receive a respective one or more first input signals, a first plurality of outputs, and a second plurality of outputs, the first translational switch configured to switchably output a first frequency version of the first input signal to any of the first plurality of outputs, and to switchably output a second frequency version of the first input signal to any of the second plurality of outputs. The second translational switch includes one or more inputs configured to receive a respective one or more second input signals, a first output, and a second output, the second translational switch configured to switchably output a first frequency version of the second input signal to the first output, and to switchably output a second frequency version of the second input signal to the second output. The signal bus, coupled between the first and second translational switches, includes: (i) a first bus line coupled to a first one of the first plurality of outputs of the first translational switch, and to the first output of the second translational switch, and (ii) a second bus line coupled to a first one of the second plurality of outputs of the first translational switch, and to the second output of the second translational switch.

These and other features of the invention will be better understood in view of the following description and drawings.

For clarity, previously-described features retain their reference numbers in subsequent drawings.

DETAILED DESCRIPTION OF EXEMPLARY EMBODIMENTS

Figure 1:
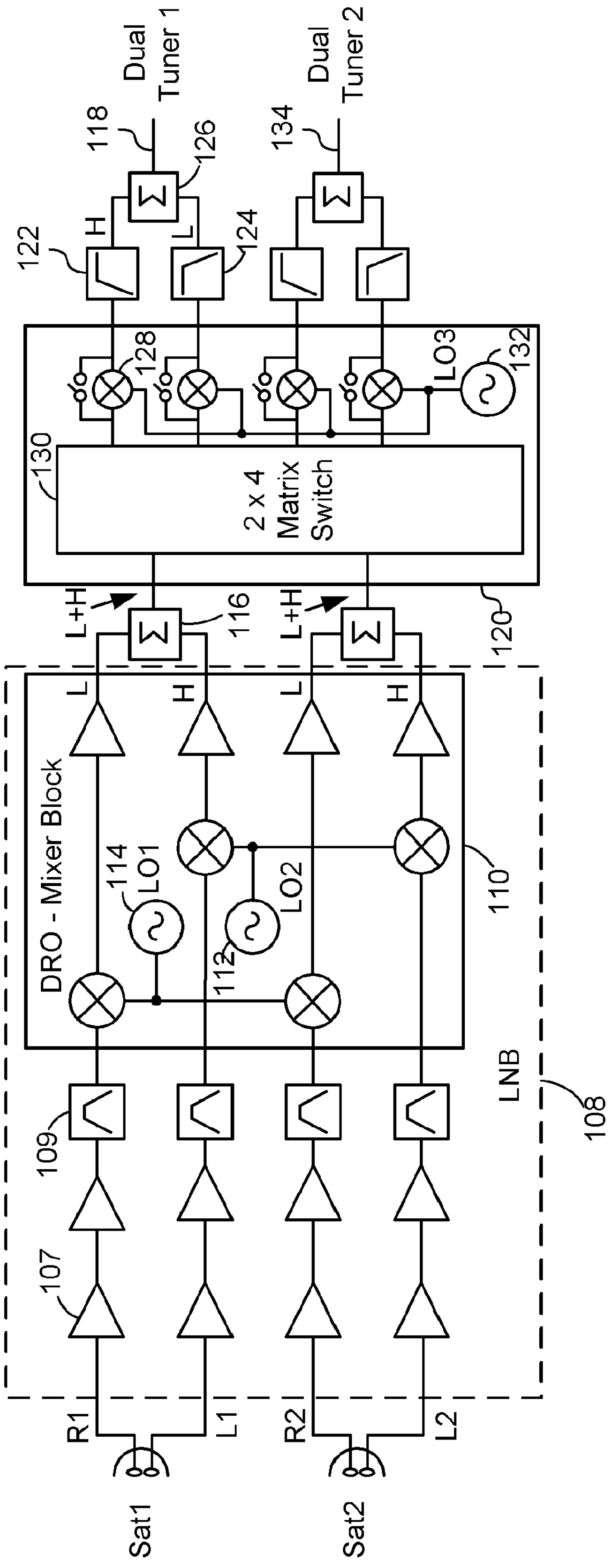
Fig. 1 Prior Art
FIG. 1 illustrates a conventional satellite television distribution system operable to construct and distribute a composite output signal.
Figure 2:
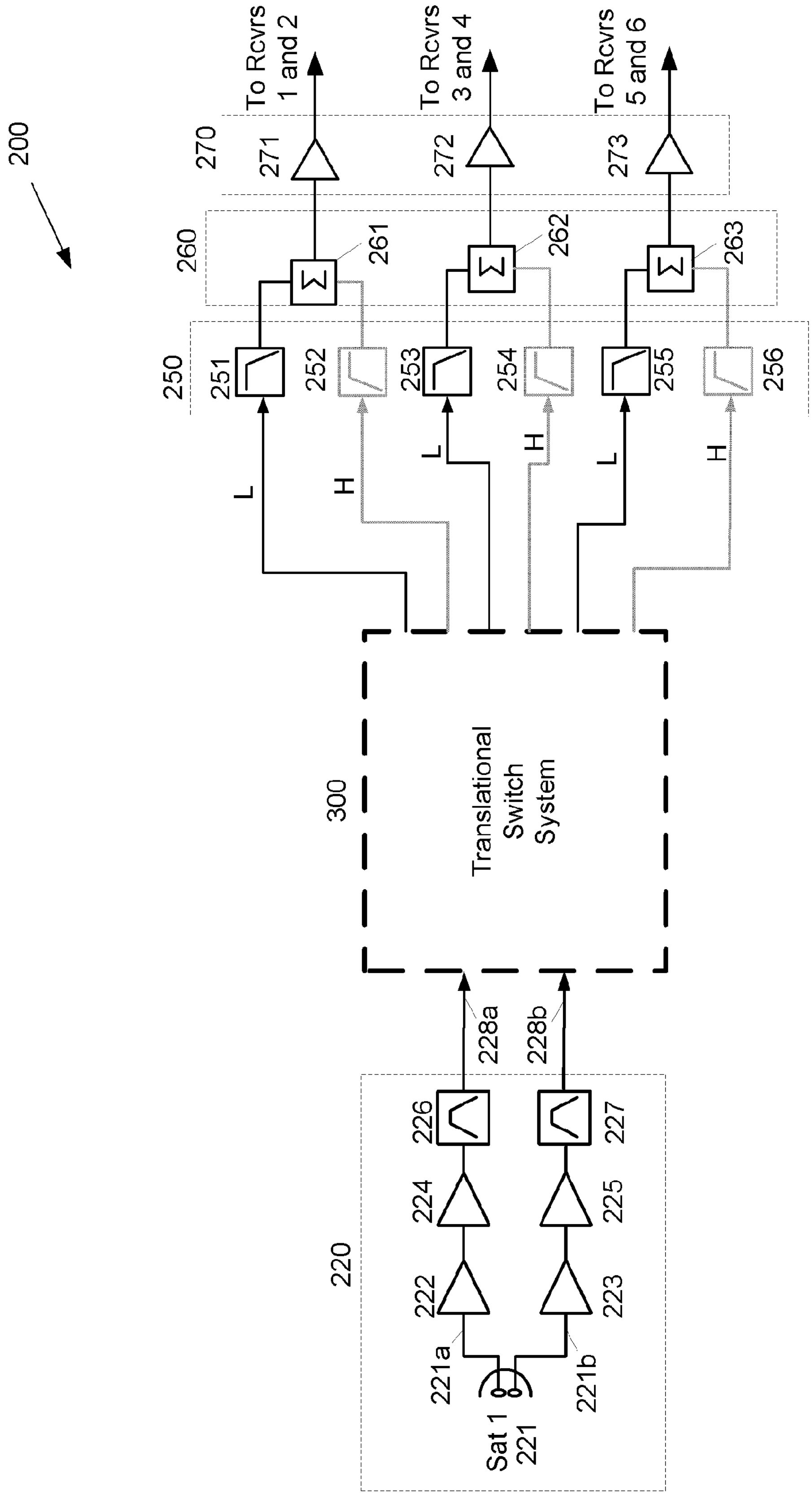
FIG. 2 illustrates a first exemplary system for constructing a composite signal in accordance with one embodiment of the present invention.

FIG. 2 illustrates a first exemplary system 200 for constructing a composite signal in accordance with one embodiment of the present invention. The exemplary system 200 includes one or more receiving modules 220, a translational switch system 301 (herein "translator"), a filter bank 250, signal combining network 260, and output amplifiers 270. Power and control signals (not shown in order to simplify the drawing) are routed to each of the components to activate and control the operating states of such components to perform the operations as described herein.

The receiving module 220 includes an antenna 221, amplifiers 222, 223, 224, and 225, and filters 226 and 227 for receiving and conditioning one or more signals. The signal may be in the form of one or more individual channels, one or more bands of channels (each band including, e.g., a group of two, three, four, five, ten or more channels), or a combination of both channels and bands. Furthermore, the received signals 221*a* and 221*b* may originate from a terrestrial or satellite source, be analog or digital in format, and be transmitted in any particular modulation format at the desired carrier frequency, e.g., in the radio frequency, optical, or infrared signal ranges.

In a particular embodiment, the antenna 221 is operable to independently two signals 221*a* and 221*b*, e.g., two substantially orthogonal signal components such as left and right hand circularly polarized signals or vertical and horizontally polarized signals. Along these lines, amplifiers 222 and 224 and filter 226 is operable to condition the first signal component 221*a* to provide an input signal 228*a* to the translator 301. Similarly, amplifiers 223 and 225 and filter 227 is operable to condition the second signal component 221*b* to provide an input signal 228*b* to the translator 301. In another embodiment, the receiving module 220 provides an antenna or other receiving means to collect one signal, in which case only one branch of signal conditioning components (amplifiers, filters, etc.) is needed. In another embodiment, three or more signal components are collected from the antenna or other receiving means (operable to detect analog or digital formatted signal in the radio frequency, optical, or infrared ranges), in which case additional signal conditioning branches operable to provide the necessary signal filtering and amplification may be employed. Moreover, while the exemplary system employs a single receive module, a plurality of receive modules, for example, 2, 3, 4, 6, 8, 10, 20 or more may be implemented, and exemplary embodiments of system implementing multiple receive modules are described below.

The system 200 further includes a translational switch system 301 ("translator") operable to perform frequency translation of the input signal 228. The translator 301 may provide any plurality of frequency translations, and in a particular embodiment provides two different frequency translations to the input signal(s). In other embodiments, the translator 301 provides 3, 4, 5, 6, 8, 10, 20, 50, 100, 1000, or more frequency translations to the input signal(s). In some embodiments of the invention, the translator 301 operates as a partial translational switch, whereby the two or more frequency versions of the input signals includes a non-translated version of the input signal, e.g., the non-translated version of the input signal serves as the first frequency version of the input signal. An example of this embodiment if further described below.

In one exemplary embodiment, the translator 301 operates to translate Ku- or Ka-band satellite signals (Ku-band satellite signals exemplified by the frequency ranges of 11.7 GHz-12.7 GHz, and Ka-band satellite signals exemplified by the frequency range of 17.3 GHz-17.8 GHz herein), or externally supplied L-band signals to either a lower L-band frequency (950-1450 MHz, indicated as signals along circuit branches labeled "L") or an upper L-band frequency (1650-2150 MHz, indicated as signals along circuit branches labeled "H") signals. The translator 301 may, of course, be used to provide other translation to and/or from other frequencies. The construction and operation of the translator 301 is further described below.

The system 200 optionally includes a filter bank 250, in which filters 251, 253 and 255 are illustrated as low pass filters and filters 252, 254 and 256 are indicated as high pass filters. Low pass filters 251, 253 and 255 operate to attenuate signal power at frequencies above the high end of the 950-1450 lower L-band, and high pass filters 252, 254 and 256 operate to attenuate signal power at frequencies below the low end of the 1650-2150 MHz upper L-band. Other filter structures, such as bandpass filters or notch/bandstop filters may be alternatively implemented. Further, the degree of filtering may vary along each of the outputs, with some outputs requiring little or no filtering, and some outputs requiring some filtering or perhaps multiple stages of filtering. The filter types used may also vary, some examples being elliptical, chebychev, butterworth, as well as other types. Moreover, while filters 250, signal combiners 260, and amplifiers 270 are illustrated as being outside of the translator 301, one, some or all of these components may be included within the translator 301.

Due to the architecture of the present invention, post-conversion filtering via filters 250 may be reduced or obviated all together on one or more of the output lines 390, as the down conversion architecture results in very little signal power residing outside of the intended frequency range of the signals supplied to the combiner circuits $\mathbf{260_1}$-$\mathbf{260_3}$. The architecture provides a relatively large frequency separation of LO and RF frequency from the output IF frequency, resulting in large separation of the undesired mixer images/unwanted sidebands from the desired IF. For instance, at Ku band the signal is around 12 GHz and the LO around 14 GHz, producing the desired IF at the difference frequency of about 2 GHz at L-band, while the undesired sideband falling to the sum frequency is around 26 GHz, far away from the desired L-band. At this high frequency, the undesired signal will typically naturally decay due to inherent high frequency roll-off properties of most elements in the system, including the receiver, and as such typically does not need much filtering for separation and removal from the desired signal. In one exemplary application in which the input signals are Ku/Ka band signals and the translator 301 is operable to down convert the Ku/Ka band signals to upper and lower L-band signals of 1650-2150 MHz (signals "H") and 950-1450 MHz (signals "L"), respectively, very little signal power resides in the 950-1450 MHz range for the upper band signals "H" supplied to the combiners $\mathbf{260_1}$-$\mathbf{260_3}$, and similarly very little signal power resides in the 1650-2150 MHz frequency range for the lower band signals "L" supplied to combiners $\mathbf{260_1}$-$\mathbf{260_3}$.

Signal combiners 261, 262 and 263 are each operable to combine the different frequency versions of the input signals to provide a composite signal. The term "composite signal" refers to a signal formed from the combination of two or more (e.g., 3, 4, 5, 10, 20, 50 or more) signals. In a particular embodiment, the signals which are to be combined may have non-overlapping frequency ranges.

In the illustrated embodiment in which two frequency translations are performed, each of the signal combiners 261, 262 and 263 include two respective inputs for receiving each of the two frequency versions of the input signal. In other embodiments in which the translator 301 provides N different frequency translations (N, being for example, 3, 4, 5, 6, 8, 10, 20, 50, 100 or more frequency translations), each signal combiner will include N inputs, each input coupled to receive a respective frequency translated output signal. While three signal combiners are illustrated, any number may be implemented as needed to supply the requisite number of receivers (e.g., set top boxes). Output amplifiers 271, 272 and 273 are optionally used to boost signal level and/or to improve output-to-output signal isolation. Once constructed, the composite signal is supplied to one or more receivers either via a wired connection (e.g., coaxial or fiber cable) or wireless connection (e.g. RF, infrared, optical link, etc.).

Figure 3:
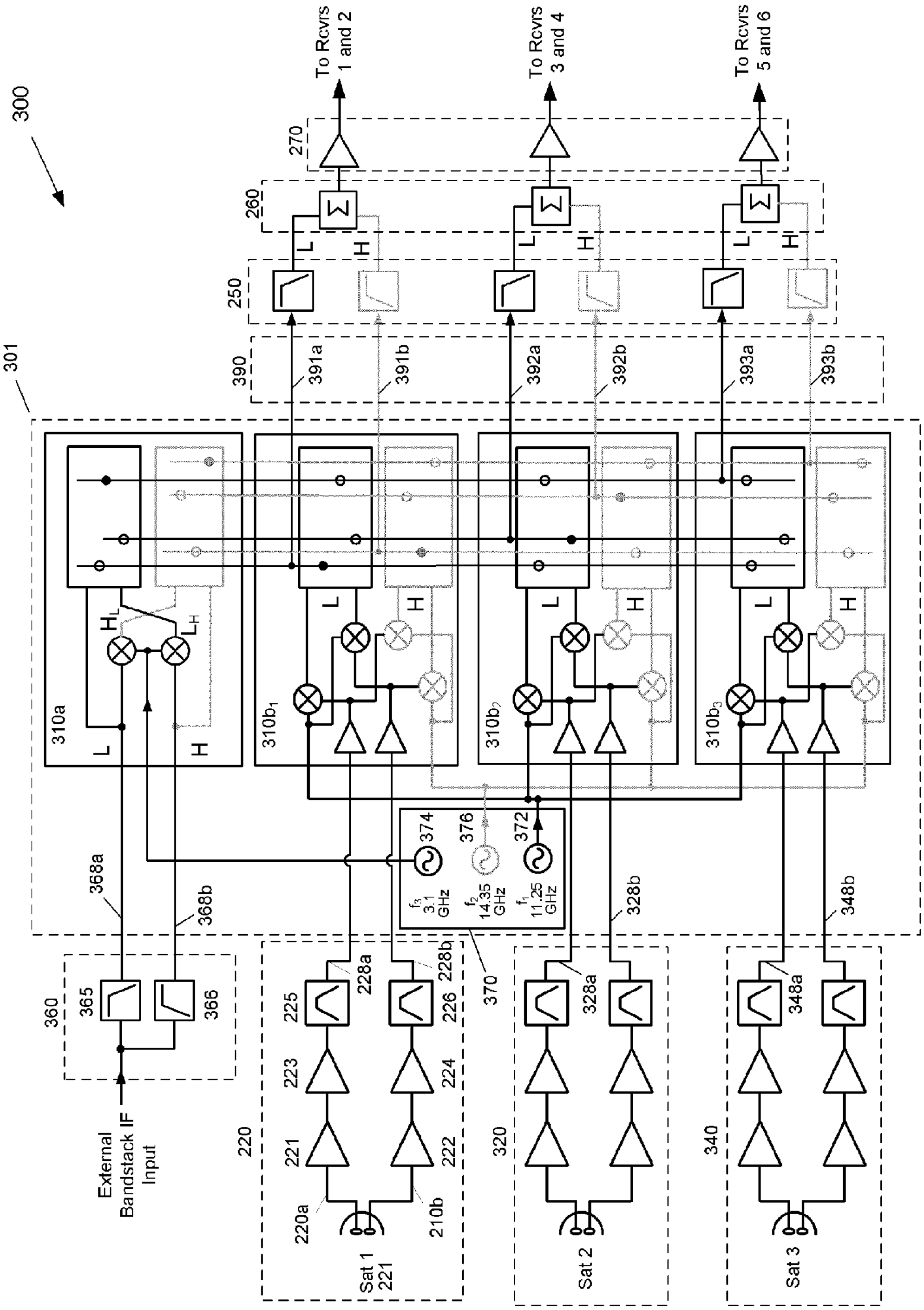
FIG. 3 illustrates a second exemplary system for constructing a composite signal in accordance with one embodiment of the present invention.

FIG. 3 illustrates a second exemplary system 300 for constructing a composite signal in accordance with one embodiment of the present invention. The exemplary system 300 includes four receive modules 220, 320, 340 and 360, a translational switching system 301 ("translator"), filters 250, signal combiners 260, and output amplifiers 270. Power and control signals (not shown in order to simplify the drawing) are routed to each of the components to activate and control the operating states of such components to perform the operations as described herein.

The receive module 220 is as described above in FIG. 2. In the illustrated embodiment, receive modules 320 and 340 are constructed similar to that of receive module 220, although some aspects, such as the received signal's frequency, modulation, polarization, or orbital slot position (when the source is a satellite) may dictate a corresponding difference in the receive modules' circuitry, for example, differences in the antenna shape/size (when the source is a satellite), differences in the gain/attenuation of the amplifiers, and/or differences in the pass band, and/or type of filters used in each of the receive modules 220, 320 and 340. Each of the receive modules 220, 320 and 340 receives and conditions (i.e., amplifies/attenuates, filters, etc.) its respective received signal(s), and outputs a corresponding signal(s). As shown, receive module 220 receives orthogonal signals 221*a* and 221*b*, and outputs corresponding signals 228*a,b* to the translator 301. In a similar manner, each of the receive modules 320 and 340 process their respective received signals 321*a,b* and 341*a,b* to provide respective signals 328*a,b* and 348*a,b* to the translator 301.

Exemplary system 300 further includes a receive module 360 operable to receive a signal operating at a previously-translated frequency, whereby the receive module 360 includes a plurality of filters operable to deconstruct a signal supplied thereto into separate signal components. In the illustrated exemplary embodiment, a low pass filter 365 and a high pass filter 366 are implemented to provide a low frequency signal component 368*a*, and a high frequency signal component 368*b*, respectively. In alternative embodiments, three or more filters (e.g., 4, 5, 6, 8, 10, or more filters) may be used to separate the supplied signal into a respective three or more signal components. As an exemplary embodiment, system 300 employs receive modules 220, 320 and 340 to receive and process RF frequency signals, e.g., Ku or Ka-band signals, and the receive module 360 to receive and process an IF frequency signal, e.g., a band stacked L-band signal, the receive module 360 operating to deconstruct the bandstacked L-band signal into a low L-band signal 368*a*, and a high L-band signal 368*b*.

Construction of the receive models 220, 320, 340 and 360 will usually be dictated by the particular application; e.g., possibly a discrete or hybrid construction when the system 300 is used to process satellite signals, or possibly an integrated circuit when the system 300 is implemented as part of an integrated receiver. The skilled person will appreciate that the receive modules may be constructed at any level of integration suitable and desirable for the particular application in which they are used.

The exemplary system 300 further includes the translator 301, which in one embodiment includes a partial translational switch 310*a*, three full translational switches 310*b*$_1$, 310*b*2 and 310*b*3, and a reference module 370. As shown, the partial translational switch 310*a* receives signals 368*a,b* from the receive module 360. The first, second, and third full translational switches 310*b*$_1$, 310*b*$_2$ and 310*b*$_3$ receive respective input signals 228*a,b*, 328*a,b*, and 348*a,b*. The term "partial" in the descriptor "partial translational switch" refers to the operation of this translator, in which one or more of its input signals are not translated in the conventional sense to another frequency (e.g., through a mixing process), but are instead coupled through the circuit at its original input frequency. The term "full" in the descriptor "full translational switch" refers to the operation of this translator, in which all of its input signals are translated to another frequency, e.g., through a mixing process. An exemplary embodiment of the partial translational switch 310*a* is illustrated in FIG. 4, and an exemplary embodiment of the full translational switches 310*b*$_1$, 310*b*$_2$, and 310*b*$_3$ is illustrated in FIG. 5.

Each of the partial and full translational switches (collectively referred to as "translational switches" for brevity) also receives a reference signal from the reference module 370. In the exemplary embodiment shown, the reference module 370 includes three reference frequency generators 372, 374 and 376 operating at 11.25 GHz, 3.1 GHz, and 14.35 GHz, respectively. These particular reference frequencies enable the processing of Ku-band satellite signals received by receive modules 220, 320, and 340, and a band-stacked L-band signal received by receive module 360. The person skilled in the art will appreciate that different reference frequencies, and/or a different number of reference sources and mixers can be employed for systems designed to process signals at other frequencies.

Figure 4:
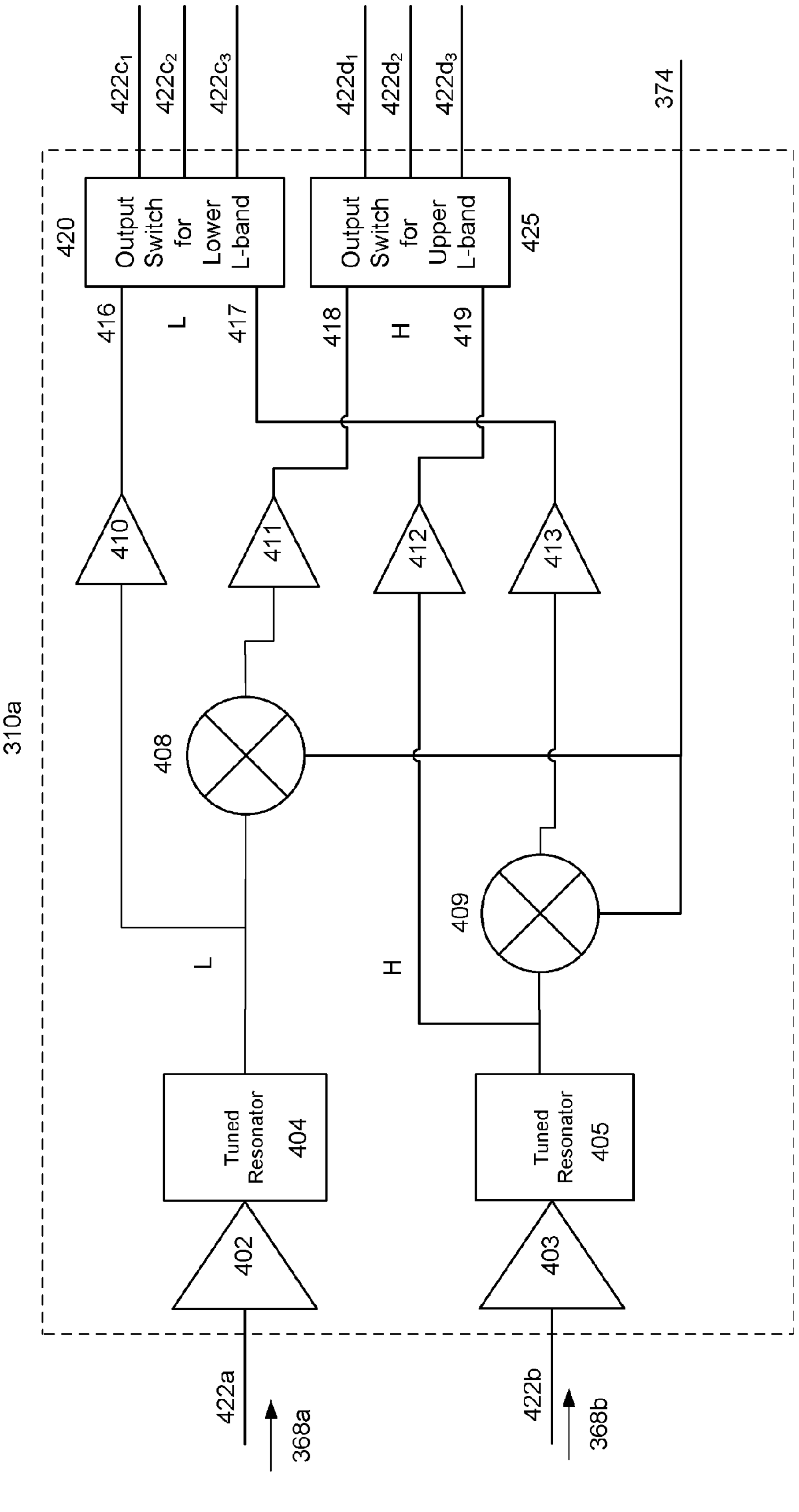
FIG. 4 illustrates an exemplary embodiment of a partial translational switch shown in FIG. 3.
Figure 5:
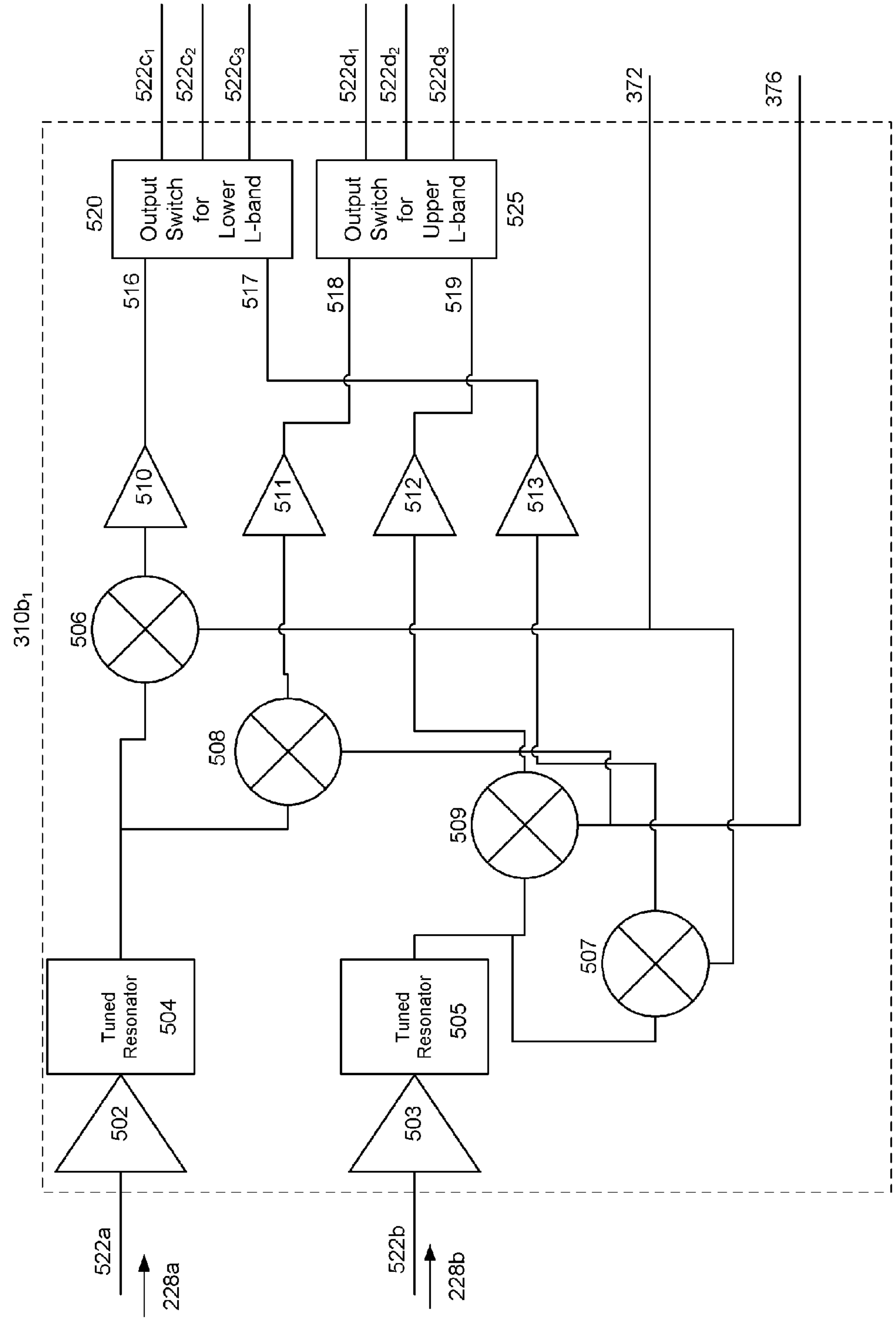
FIG. 5 illustrates an exemplary embodiment of a full translational switch shown in FIG. 3.

Each translational switch 310*a*, 310*b*$_1$-310*b*$_3$ processes their respective signals 368*a,b*, 228*a,b*, 328*a,b*, and 348*a,b* in a manner as further described in FIG. 4. In general, each of the translational switches produces a plurality of different frequency versions of their received signal(s); i.e., each translational switch produces its input signal(s) at two or more different frequencies. In the exemplary embodiment of FIG. 3, each translational switch produces two different frequency versions of their respective input signals, although in other embodiments 3, 4, 5, 6, 8, 10, 20 or more frequency translations may be performed. Each translation switch produces a first frequency version of its input signal(s) within the lower L-band range of 950-1450 MHz (signals indicated by the letter "L", and a second frequency version of its input signal (s) within the upper L-band range of 1650-2150 MHz (signals indicated by the letter "H"). In the exemplary embodiment of FIG. 3, each translational switch is provided with two input signals, and correspondingly, each translational switch provides a first frequency version for each input signal, indicated by "L" for low L-band signal (total of two "L" signals provided per translational switch), and a second frequency version for each input signal, indicated by "H" for upper or high L-band signal (total of two "H" signals provided per translational switch).

The translator 301 further includes a reference source 370, for providing the reference signals used by the translational switches 310*a* and 310*b*. In the exemplary embodiment shown, reference source 370 includes three signal generators 372, 374 and 376 operable to generate a respective three reference signals. In one embodiment, the reference sources 372, 374 and 376 are PLL-controlled oscillators. Alternatively, the reference sources 372 and 374 may be dielectric resonator oscillators. One or more of the reference sources 372, 374 and 376 may be of a fixed frequency or variable frequency type.

Further exemplary of the translator 301 is a signal bus 380, which couples to each translational switch 310*a* and 310*b*$_1$-*b*$_3$. The construction and operation of the signal bus is further described in FIG. 6, but in general the signal bus 380 operates to selectively couple any of the H or L signals to any one of the output lines 390 (hollow circles indicating a controllable or selectively-coupled connection that is presently open, and a darkened circle indicating selectively-coupled connection that is presently closed/made).

In the exemplary arrangement of FIG. 3, each output line 391*a*, 392*a*, and 393*a* is selectively coupled, via signal bus 380, to receive a respective one of the low L-band signals provide by the translational switches, and each output line 391*b*, 392*b*, 393*b* is selectively coupled, via signal bus 380, to receive a respective one of the high L-band signals provided by the translational switches. As can be seen, the first and second versions of the input signals may be supplied to alternating bus lines, so as to improve signal isolation between lines carrying the same frequency signals. Similarly, the signal bus 380 may be operable to supply the first and second versions of the input signals to alternating output lines 390 to improve signal isolation. Collectively, the output lines 391*a, b*, 392*a, b* and 393*a, b* are arranged such that each receiver (via signal combiner 261, or 262, or 263) is supplied with any one of a low L-band signal and any one of a high L-band signal. In this manner, each receiver can independently receive a composite signal formed by any one of the low L-band signals and any one of the high L-band signals. Of course, information included within each of the low and high L-band signals, e.g., one or more television channels, could thus be supplied to any receiver of the system 300, independent of the television channel(s) (i.e., the composite signal) delivered to another receiver of the system.

FIG. 4 illustrates an exemplary embodiment of a partial translational switch 310*a* shown in FIG. 3. Power and control signals (not shown in order to simplify the drawing) are routed to each of the components to activate and control the operating states of such components to perform the operations as described herein.

The partial translational switch 310*a* includes a first input 422*a* for receiving signal 368*a*, second input 422*b* for receiving signal 368*b* (signals 368*a* and 368*b* being, for example, lower and upper L-band signals provided via an external source), output ports 422*c*$_1$-422*c*$_3$ for providing a first frequency version of the received signals 368*a* and/or 368*b*, and output ports 422*d*$_1$-422*d*$_3$ for providing a second frequency version of the received signals 368*a* and/or 368*b*.

Internally within the partial translational switch 310*a*, received signals 368*a* and 368*b* are processed in parallel. A non-frequency translated version of signal 368*a* is supplied to the first output switch 420. Signal 368*a* is additionally supplied to a mixer 408, which produces a frequency-translated version of signal 368*a*, that signal supplied to the second output switch 425. Similarly, a non-frequency translated version of signal 368*b* is supplied to the second output switch 425. Signal 368*b* is additionally supplied to a mixer 409, which produces a frequency-translated version of signal 368*b*, that signal supplied to the first output switch 420. Mixers 408 and 409 are supplied with reference signal from source 374, a signal at 3.1 GHz in the illustrated embodiment. Optional circuitry (amplifiers 402, 403, 410, 411, 412, 413, and a tuned resonators 405 and 404) may be used to provide the required signal level/characteristics.

In the illustrated embodiment, signal 368*a* is a lower L-band signal that is frequency-translated (up converted) to the upper L-band (1650-2150 MHz) by mixer 408. Further exemplary, signal 368*b* is an upper L-band signal that is frequency-translated (down converted) to the lower L-band (950-1450 MHz) by mixer 409. Mixers 408 and 409 may be configured to differently in alternative embodiments to provide either signal up conversion or down conversion.

The levels of integration for the translational switch 310*a* may vary. In a particular embodiment, frequency source 370 is implemented outside the translational switch 310*a* and can be shared with other translational switches, as shown in FIG. 3. Further exemplary, the first and second output switches 420 and 425 are implemented on the same semiconductor die, and coupled to the semiconductor die housing circuitry of the system with the frequency source 370 in a manner described in FIG. 7C. The skilled person will appreciate that other levels of integration are possible (for example, an IC integrating all of the illustrated components), as well as the variety of integrated circuit fabrication techniques and materials (e.g., Si, SiGe, or GaAs, etc.) that may be used to form such devices. For example, the translator 301 may be constructed in a system-in-package (SIP) form, in which translational switches 310*a*, 310*b*$_1$-310*b*$_3$, and frequency source 370 are implemented as discrete circuits of dice/ICs interconnected via a routing plane on a substrate, such as a printed circuit board and assembled in a separate package.

As shown in FIG. 4, the first frequency versions of signal 368*a* (signal 416) and signal 368*b* (signal 417) are each supplied to a first output switch 420, and the second frequency versions of signal 368*a* (signal 418) and signal 368*b* (signal 419) are each supplied to a second output switch 425. In an exemplary embodiment, the first switch 420 operates to apply signal 416 or signal 417 to any one, some, or all of the outputs 422*c*$_1$-422*c*$_3$, concurrently supplying signals 416 and 417 to different outputs 422*c*$_1$-422*c*$_3$ not excluded. Further exemplary, the second switch 425 operates to apply either signal 418 or signal 419 on any one, some, or all of the outputs 422*d*$_1$-422*d*$_3$, concurrently supplying signals 418 and 419 to different outputs 422*d*$_1$-422*d*$_3$ not excluded. In this manner, the translational switch 310*a* is operable to output any of the first frequency (lower L-band) versions of signals 368*a* or 368*b* on any one or more of the output ports 422*c*$_1$-422*c*$_3$, as well as output any of the second frequency (upper L-band) versions of the received signal 368*a* or 368*b* on any one or more of the output ports 422*d*$_1$-422*d*$_3$. Optionally, each of the first and second output switches 420 and 425 is operable to provide the possibility of different combinations of impedance states versus signal states. While the signal can be either on (passed) or off (null output signal), in either of these two states the switch output impedance (seen as the source impedance driving the subsequent load) can be designed to assume any desired impedance level (low, medium or high impedance), depending on the specific design goals and requirements. The switch can be designed to stay in the same impedance condition upon switching on or off, or it can be designed to change the impedance as the signal state is changed, the choice depending on the specifics of the bus structure/load arrangement. For example, the impedance state/signal state combination may represent a matched impedance state when the signal is on, but a high impedance, or a low impedance state when the signal is off, or any combination thereof. Further discussion on the switch and bus impedance conditions is provided in conjunction with FIGS. 7E and 7F. The off state or null output signal may be defined as a signal which does not exceed a predefined signal level. For example, the null output signal may be a signal substantially at ground potential, or it may be defined as a signal having an amplitude which is below that of a predefined detection level (e.g., a signal level more than 10 dB below a reference level known to correspond to a received valid or "on" signal). Further exemplary, the null output signal may have a predefined level around (i.e., above or below) the signal ground (e.g., a predefined DC offset), or the null output signal may consist of a zero differential signal. The foregoing serves only as a few examples known to the skilled person, although other representations of a null output signal can also be used as well.

In the foregoing description, output switches 420 and 425 are included within the full translational switch 310*a*. In another embodiment, switches 420 and 425 are components which are discrete from the full translational switch 310*a*. In still another embodiment, switches 420 and 425 are included within the signal bus 380.

FIG. 5 illustrates an exemplary embodiment of a full translational switch 310*b*$_1$ shown in FIG. 3. In a specific embodiment of the invention, translational switches 310*b*$_1$, 310*b*$_2$ and 310*b*$_3$ are identically constructed, although this is not necessary in all instances, and the translational switches 310*b* may differ between them as to the number of inputs, number of outputs, or both. Power and control signals (not shown in order to simplify the drawing) are routed to each of the components to activate and control the operating states of such components to perform the operations as described herein.

The full translational switch 310*b*$_1$ includes a first input 522*a* for receiving signal 228*a*, and a second input 522*b* for receiving signal 228*b* (signals 228*a* and 228*b* being, for example, orthogonal signals transmitted from a common source, such as a satellite, in an exemplary embodiment), output ports 522*c*$_1$-522*c*$_3$ for providing a first frequency version of the received signals 228*a* and/or 228*b*, and output ports 522*d*$_1$-522*d*$_3$ for providing a second frequency version of the received signals 228*a* and/or 228*b*.

Internally within the full translational switch 310*b*$_1$, received signals 228*a* and 228*b* are processed in parallel. Signal 228*a* is supplied to an optional amplifier (e.g., a low noise amplifier) 502 and tuned resonator 504. The resultant signal is subsequently supplied to each of two mixers 506 and 508 for providing the first and second frequency versions of signal 228*a*, respectively. Mixer 506 is supplied with reference signal from source 372, 11.25 GHz in an exemplary embodiment, and mixer 508 is supplied with reference signal from source 376, a signal operating at 14.35 GHz in the exemplary embodiment.

Each of the mixers 506 and 508 may perform any particular frequency translation, and in a particular embodiment, each mixer performs a down conversion of the received signal to respective first and second IF frequencies. In an alternative embodiment, each of the mixers 506 and 508 performs an up conversion process in which the respective first and second output frequencies are higher in frequency than the supplied input signal 228*a*.

A first frequency version (e.g., a lower band) of the received signal 228*a* (signal 516) is output from mixer 506, and a second frequency version of the received signal 228*a* (signal 518) is output from mixer 508. Optional amplifiers 510 and 512 may be used to provide amplification and buffering to each of the signals 516 and 518.

Along a parallel path, signal 228*b* is similarly processed by means of an optional input amplifier 503, tuned resonator 505, and two mixers 507 and 509, thus resulting in a first frequency version of signal 228*b* output from mixer 507 (signal 717), and a second frequency version of signal 228*b* output from mixer 509 (signal 519). Optional amplifiers 511 and 513 may be employed to provide amplification and buffering to each of the signals 517 and 519. Mixer 507 is supplied with reference signal from source 372, 11.25 GHz in an exemplary embodiment, and mixer 509 is supplied with reference signal from source 376, a signal operating at 14.35 GHz in the exemplary embodiment.

As shown, the first frequency versions of signal 228*a* (signal 516) and signal 228*b* (signal 517) are each supplied to a first output switch 520, and the second frequency versions of signal 228*a* (signal 518) and signal 228*b* (signal 519) are each supplied to a second output switch 525. In an exemplary embodiment, the first switch 520 operates to apply signal 516 or signal 517 to any one, some, or all of the outputs $\mathbf{522}c_1$-$\mathbf{522}c_3$, concurrently supplying signals 516 and 517 to different outputs $\mathbf{522}c_1$-$\mathbf{522}c_3$ not excluded. Further exemplary, the second output switch 525 operates to apply either signal 518 or signal 519 on any one, some, or all of the outputs $\mathbf{522}d_1$-$\mathbf{522}d_3$, concurrently supplying signals 518 and 519 to different outputs $\mathbf{522}d_1$-$\mathbf{522}d_3$ not excluded. In this manner, the translational switch $\mathbf{310}b_1$ is operable to output any of the first frequency (lower L-band) versions of signals 228*a* or 228*b* on any one or more of the output ports $\mathbf{522}c_1$-$\mathbf{522}c_3$, as well as output any of the second frequency (upper L-band) versions of the received signal 228*a* or 228*b* on any one or more of the output ports $\mathbf{522}d_1$-$\mathbf{522}d_3$. Regarding output impedance and signal conditions, the same considerations as in conjunction with FIG. 4 described above are applicable.

In the foregoing description, output switches 520 and 525 are included within the full translational switch 310*b*1. In another embodiment, switches 520 and 525 are components which are discrete from the full translational switch $\mathbf{310}b_1$. In still another embodiment, switches 520 and 525 are incorporated within the signal bus 380.

In a particular embodiment, received signals 228*a* and 228*b* are orthogonal Ku-band signals, mixers 506-509 are operable as down converters for down converting the received signals into L-band signals 516, 517, 518 and 519, and the first and second output switches 520 and 525 are L-band 2×3 switches. Further exemplary, the illustrated circuit (either in its entirety or in part) may be realized in either a differential signal construction or a single-ended signal construction. Alternative embodiments may be practiced in accordance with the invention. For example, the mixers 506-509 may be made operable as up-converting mixers, and the first and second switches 520 and 525 may be made operable at other frequencies. In addition, oscillators/PLL 530 and 540 can be implemented in or outside the IC and can be shared with other frequency translation devices in the system. Furthermore, the circuit may be fabricated as a monolithic integrated circuit in any particular base substrate material, a few examples being Si, SiGe, or GaAs.

Figure 6A:
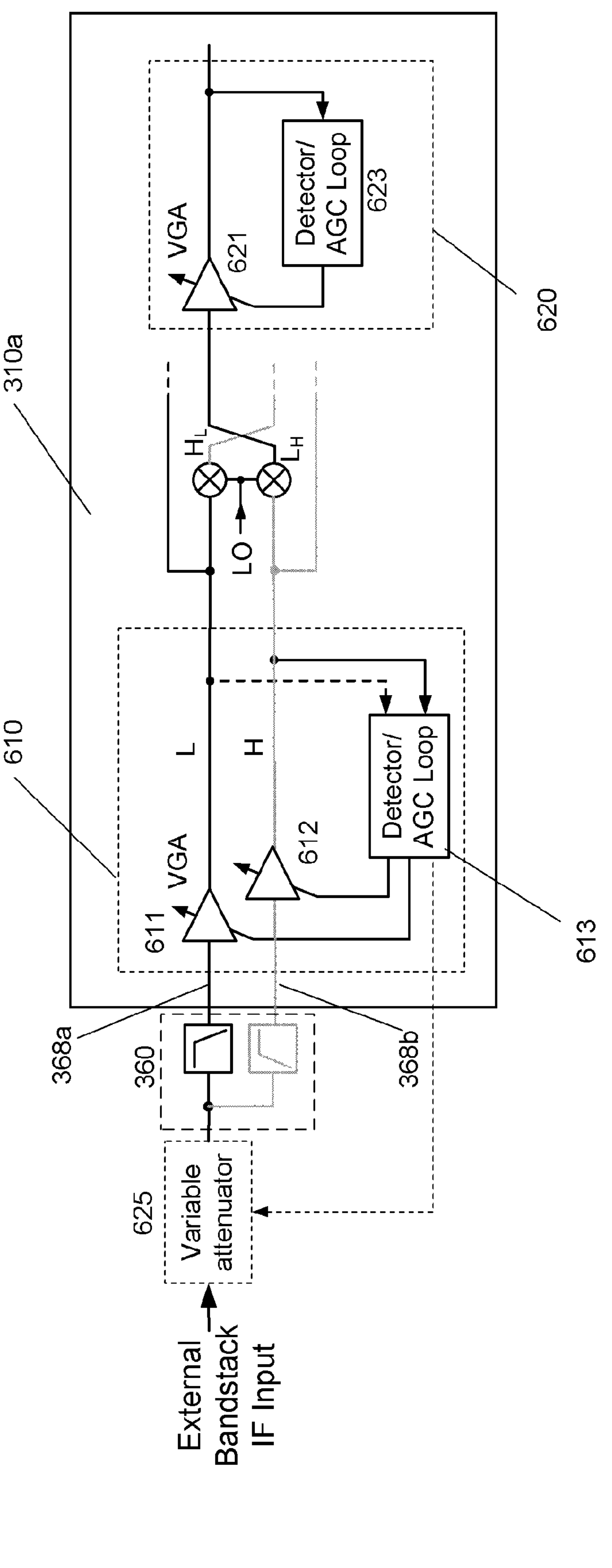
FIG. 6A illustrates an exemplary partial translational switch employing automatic gain control circuitry in accordance with one embodiment of the present invention.

FIG. 6A illustrates an exemplary partial translational switch employing automatic gain control (AGC) circuitry in the pre- and post-mixing stages in accordance with one embodiment of the present invention. The AGC circuitry includes a first stage AGC circuit 610, a second stage AGC circuit 620, and an optional variable attenuator 625 controllable by the first stage AGC circuit 610 or alternatively by the second stage 620 (the former shown in the figure). Power and control signals (not shown in order to simplify the drawing) are routed to each of the components to activate and control the operating states of such components to perform the operations as described herein.

In the exemplary embodiment of FIG. 6A, AGC control is provided at both the input (front-end) of the mixing/conversion process, as well as at the output (back-end), after the mixing. Both front and back AGC stages can be used, although depending on the signal characteristics and/or requirements, only one AGC (or none) of the AGC stages 610 or 620 may be used.

The first stage AGC circuit 610 includes variable gain amplifiers (VGA) 611 and 612 coupled to the input lines carrying the L and H signals, 368*a*, and 368*b*, earlier described. The first AGC circuit 610 further includes a detector and loop circuitry 613 operable to sample the signal from each VGA 611 and 612. The AGC loop circuitry (which typically consists of a loop amplifier and a loop filter) generates control signals controlling the VGAs 611 and 612. While a single detector 613 is illustrated, separate detectors measuring separate input lines can be used. The implementation of a single detector monitoring one of the input lines provides benefits, e.g. simpler circuitry and lower power dissipation. Such an arrangement can be useful in the case when the signals in both input lines are equal or correlated to each other, when one level can be estimated based on the measurement of the other. Alternatively, before detection, the two signals can be summed or combined together, then fed to a common detector (e.g., 613), in which case the AGC circuit 610 tracks the average level (or weighted average) of the two input signals. If high isolation between the two signals must be maintained, to avoid potential isolation degradation due to summing amplifiers, two separate detectors can be used with their outputs combined together, requiring only one, common loop amplifier/filter, thus saving the hardware. In the case of separate detectors, either individual AGC loops can be used to control each VGA separately/independently, or a common loop amplifier/filter can be used to control both. Optionally, a variable attenuator 625 can be used (e.g., an external PIN diode attenuator), the control of which is provided by either the first AGC circuit 610 (illustrated via a dashed line), or alternatively by the second VGA circuit 620.

The second or post-mixer output AGC circuit 620 is placed in each of the output lines (only one output shown for clarity) supplied to the signal bus 380. This AGC circuit 620 includes a VGA 621 and detector and a loop amplifier/filter 623. Detector/loop and VGA arrangements similar to those described for AGC circuit 610 above can be deployed for the AGC circuit 620 as well.

Because AGC removes substantially all gain/loss uncertainty accumulated before the point of detection, the detector is typically located further downstream the signal path. Accordingly, the back-end AGC 620 is more effective than the front-end in absorbing the gain/loss variability in the system. However, the back-end AGC 620 puts more burden on the dynamic range of the devices upstream from the VGA 621, since, in this case the upstream components (i.e., VGAs 611 and 612) need to handle wider signal range levels. The AGC circuit 620 can be optimized based on the trade-off of these and other considerations for each particular design case. The detection point and the location of the VGA are not required to be adjacent or close to each other in the signal path. For example, sensing the signal level at far downstream point and feeding the signal back into a variable gain element at an upstream position in the signal flow, even at the very input may be beneficial in optimizing the signal level distribution and dynamic range of the system.

Figure 6B:
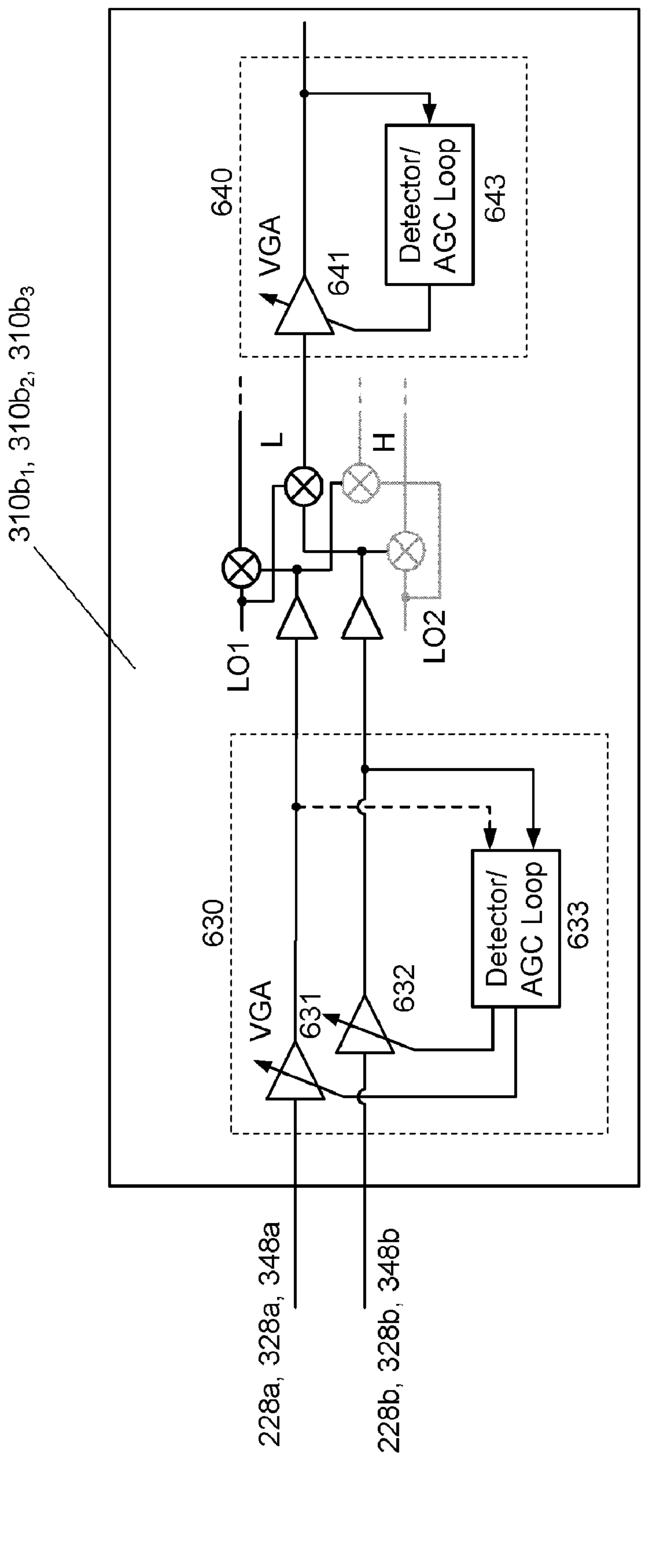
FIG. 6B illustrates an exemplary full translational switch employing automatic gain control in accordance with one embodiment of the present invention.

FIG. 6B illustrates an exemplary full translational switch employing automatic gain control in the pre- and post-mixing stages in accordance with one embodiment of the present invention. The AGC circuitry includes a first stage AGC circuit 630, and a second stage AGC circuit 640. Power and control signals (not shown in order to simplify the drawing) are routed to each of the components to activate and control the operating states of such components to perform the operations as described herein.

The first (front-side) and second (back-side) AGC circuits 630 and 640 operate in a manner similar to the AGC circuits 610 and 620 shown in FIG. 6A. Both front and back AGC stages 630 and 640 can be used, although depending on the signal characteristics and/or requirements, only one AGC (or none) of the AGC stages may be used.

The first stage AGC circuit 630 includes variable gain amplifiers (VGA) 631 and 632 coupled to the input lines carrying the L and H signals, 228*a,b* or 328*a,b* or 348*a*, earlier described. The first AGC circuit 630 further includes a detector and loop circuitry 633 operable to sample the signal from each VGA 631 and 632. The AGC loop circuitry (which typically consists of a loop amplifier and a loop filter) generates control signals controlling the VGAs 631 and 632. The VGA/detector configurations can be arranged in the manners as described above in FIG. 6A The second or post-mixer output AGC circuit 640 is placed in each of the output lines (only one output shown for clarity) supplied to the signal bus 380. This AGC circuit 640 includes a VGA 641 and detector and a loop amplifier/filter 643. Detector/loop arrangements similar to those described for AGC circuit 610 above can be deployed for the AGC circuit 640 as well.

Figure 7A:
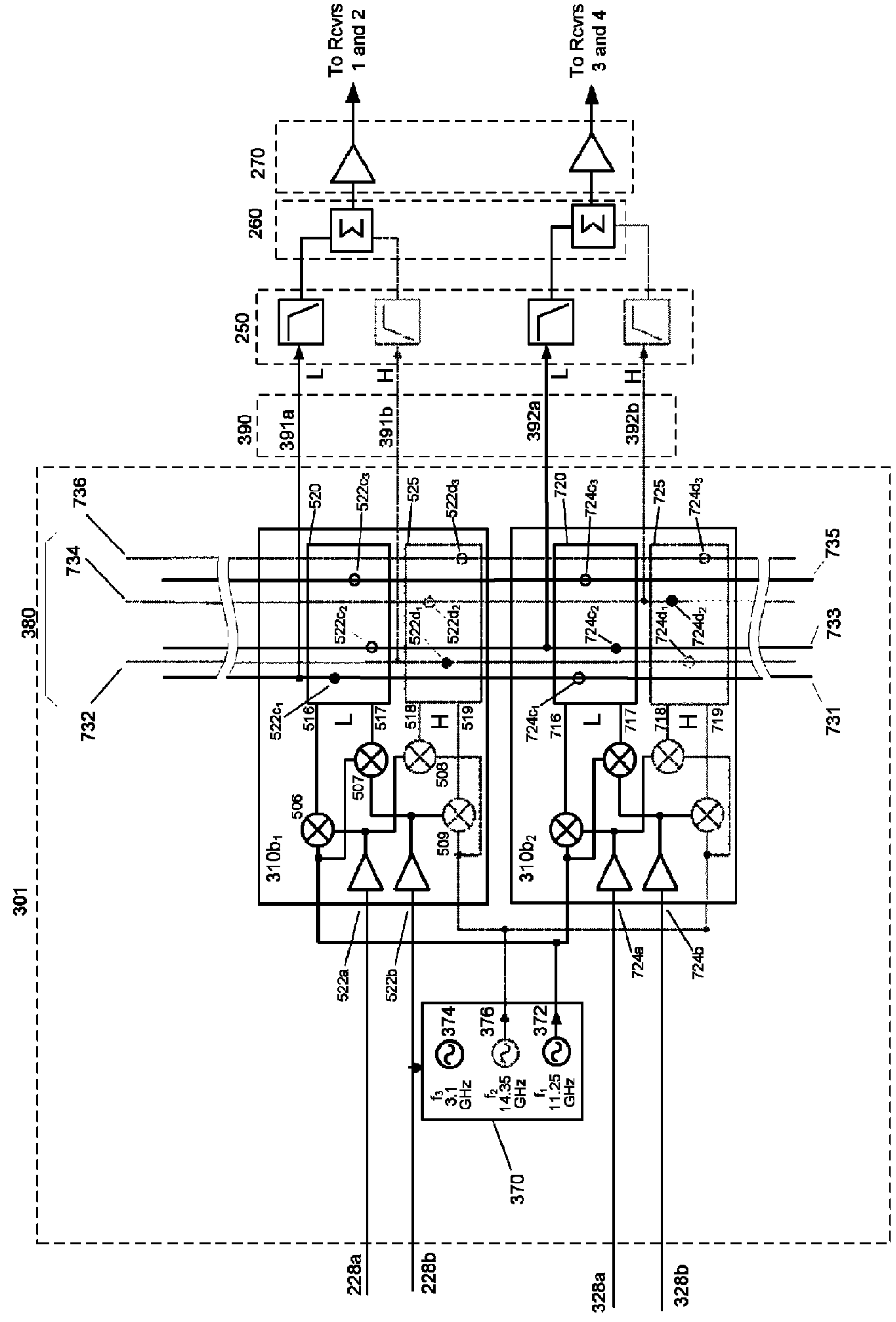
FIG. 7A illustrates a detailed partial view of the signal bus implemented within the translational switching system of FIG. 3.

FIG. 7A illustrates a detailed partial view of the signal bus implemented within the translator 301 of FIG. 3. The view represents a portion of the schematic shown in FIG. 3, and illustrates the signal bus 380 coupled between two full translational switches 310*$b_1$* and 310*$b_2$*. Other features of the schematic are omitted to facilitate presentation and description of the illustrated features. Power and control signals (not shown in order to simplify the drawing) are routed to each of the components to activate and control the operating states of such components to perform the operations as described herein.

As shown, the translator 301 includes a first translational switch (shown as the full translational switch 310*$b_1$*, although in another embodiment the partial translational switch 310*a* may be implemented as shown below), a second translational switch (shown as the full translational switch 310*$b_2$*), and a signal bus 380. The first translational switch 310*$b_1$* includes one or more inputs (two shown 522*a,b*) configured to receive a respective one or more first input signals (two shown 228*a, b*), a first plurality of outputs (three shown, 522*$c_1$*-522*$c_3$*), and a second plurality of outputs (three shown, 522*$d_1$*-522*$d_3$*). As noted, the first translational switch 310*$b_1$* is configured to switchably output a first frequency version of the first input signal (e.g., low L-band signal) to any of the first plurality of outputs 522*$c_1$*-522*$c_3$*, and to switchably output a second frequency version of the first input signal (e.g., low L-band signal) to any of the second plurality of outputs 522*$d_1$*-522*$d_3$*.

The second translational switch 310*$b_2$* is structured and functions similarly to the first translational switch 310*b1*, having one or more inputs 724*a,b* configured to receive a respective one or more second input signals 328*a,b*, a first plurality of outputs (three shown, 724*$c_1$*-724*$c_3$*), and a second plurality of outputs (three shown, 724*$d_1$*-724*$d_3$*). The second translational switch 310*$b_2$* is configured to switchably output a first frequency version of the second input signal 328*a,b* to any of the first plurality of outputs 724*$c_1$*-724*$c_3$*, and to switchably output a second frequency version of the second input signal 328*a,b* to any of the second plurality of outputs 724*$d_1$*-724*$d_3$*.

The signal bus 380 is coupled between the first and second translational switches 310*$b_1$*, 310*$b_2$*, and includes at least a first bus line 731 and a second bus line 732. The first bus line 731 is selectively coupled to a first one of the first plurality of outputs (shown as output 522*$c_1$*) of the first translational switch 310*$b_1$*, and also to a first one of the first plurality of outputs (shown as output 724*$c_1$*) of the second translational switch 310*$b_2$*. The second bus line 732 is selectively coupled between a first one of the second plurality of outputs (shown as output 522*$d_1$*) of the first translational switch 310*$b_1$*, and to a first one of the second plurality of outputs (shown as output 724*$d_1$*) of the second translational switch 310*$b_2$*. Switches 520 and 720 are collectively controlled to determine which of the outputs 522*$c_1$* or 724*$c_1$* is to be coupled to the first bus line 731. In the exemplary embodiment of FIG. 7A where hollow circles indicating a switchably-coupled, open connection, and a darkened circle indicating a switchably-coupled, closed connection, output 522*$c_1$* of first translational switch 310*$b_1$* is coupled to the first bus line 731, and therethrough to the first output line 391*a*, and output 522*$d_2$* of first translational switch 310*$b_1$* is coupled to the second bus line 732, and therethrough to the second output line 391*b*. The foregoing arrangement is merely exemplary, and other connection arrangements may be employed in alternative embodiments.

As further illustrated, the signal bus 380 includes at least third and fourth bus lines 733 and 734. The third bus line 733 is selectively coupled to a second one of the first plurality of outputs (shown as output 522*$c_2$*) of the first translational switch 310*$b_1$*, and to a second one of the first plurality of outputs (shown as output 724*$c_2$*) of the second translational switch 310*$b_2$*. The fourth bus line 734 is coupled to a second one of the second plurality of outputs (shown as 522*$d_2$*) of the first translational switch 310*$b_1$* and to a second one of the second plurality of outputs (shown as output 724*$d_2$*) of the second translational switch 310*$b_2$*. In this arrangement, the first and third bus lines 731, 733 are each operable to support the propagation of the first frequency version (e.g., the low L-band version) of the first or second input signals 228*a,b*, or 328*a,b*, and the second and fourth bus lines 732, 734 are each operable to support the propagation of the second frequency version (e.g., the upper/high L-band version) of the first or second input signals 228*a,b* or 328*a,b*. Further particularly, the first and third bus lines 731, 733 may be interleaved with the second and fourth bus lines 732, 734, thereby providing an additional degree of signal isolation between the two bus lines carrying the signals of the same frequency band. In particular, at least one line of a different frequency is interposed between bus lines carrying signals at the same frequency.

As noted above, output switches 520, 525, 720 and 725 may be included within the respective translational switches 310*$b_1$* and 310*$b_2$*, or provided as discrete components therefrom, or be included within the signal bus 380. In the exemplary embodiment of FIG. 7A in which the translational switches 310*$b_1$* and 310*$b_2$* include output switches 520, 525 and 720, 725, respectively, output switch 520 includes first and second inputs 516 and 517 for receiving the first frequency version (low L-band signal "L") of the first input signal 228 (first signal portion 228*a* supplied to first input 516, and second signal portion 228*b* supplied to the second input 517), and a plurality of outputs 522$c_1$-$c_3$. The second output switch 525 includes first and second inputs 518 and 519 for receiving a second frequency version (upper/high L-band signal "H") of the first input signal 228 (first signal portion 228*a* supplied to first input 518, and second signal portion 228*b* supplied to the second input 519), and a plurality of outputs 522$d_1$-$d_3$.

The second translational switch 310$b_2$ includes first and output switches 720 and 725, the first output switch 720 including first and second inputs 716 and 717 for receiving a first frequency version (lower L-band signal "L") of the second input signal 328 (first signal portion 328*a* supplied to first input 716, and second signal portion 328*b* supplied to the second input 717), and a plurality of outputs 724$c_1$-$c_3$. The second output switch 725 includes first and second inputs 718 and 719 for receiving the second frequency version (upper/high L-band signal "H") of the second input signal 328 (e.g., first signal portion 328*a* supplied to first input 718, and second signal portion 328*b* supplied to the second input 719), and a plurality of outputs 724$d_1$-$d_3$.

In the exemplary embodiment of FIG. 7A, signal bus 380 includes bus lines 731-736, bus lines 731, 733, and 735 operable to route the first frequency version (e.g., the low L-band signal version) of either the first or second signals 228 or 328 to any of the output lines 391*a* or 392*a*. Similarly, bus lines 732, 734, and 736 operate to route the second frequency version (e.g., the upper L-band signal version) of either the first or second signals 228 or 328 to any of the output lines 391*b* or 392*b*. In particular, bus line 731 is shown coupled to output 522$c_1$ and output line 391*a*, thus supplying receivers 1 and 2 with the first frequency version of the first input signal 228 (either signal 228*a* or 228*b* as selected by switch 520). Bus line 732 is shown coupled to output 522$d_1$ and output line 391*b*, thus supplying receivers 1 and 2 with the second frequency version of the first input signal 228 (either signal 228*a* or 228*b* as selected by switch 520). Bus line 733 is shown coupled to output 724$c_2$ and output line 392*a*, thus supplying receivers 3 and 4 with the first frequency version of the second input signal 328 (either signals 328*a* or 328*b* as selected by switch 720). Bus line 734 is shown coupled to output 724$d_2$ and output line 392*b*, thus supplying receivers 3 and 4 with the second frequency version of the second input signal 328 (either signals 328*a* or 328*b* as selected by switch 720). As noted above, the first and second versions of the input signals may be supplied to alternating bus lines, so as to improve signal isolation between lines carrying the same frequency signals. Similarly, the signal bus 380 may be made operable to supply the first and second versions of the input signals to alternating output lines to improve signal isolation.

Figure 7C:
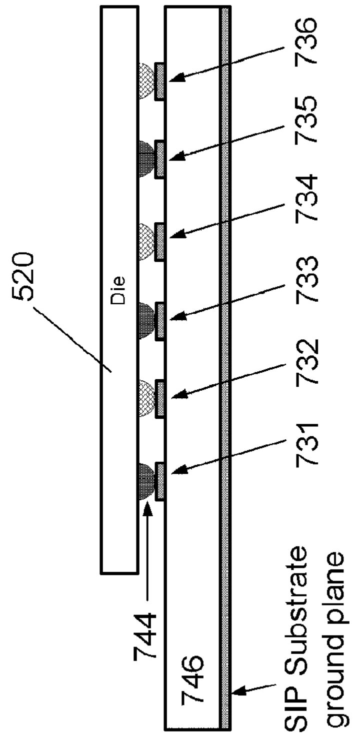
FIG. 7C illustrates an exemplary layout of the signal bus in accordance with one embodiment of the present invention.
Figure 7B:
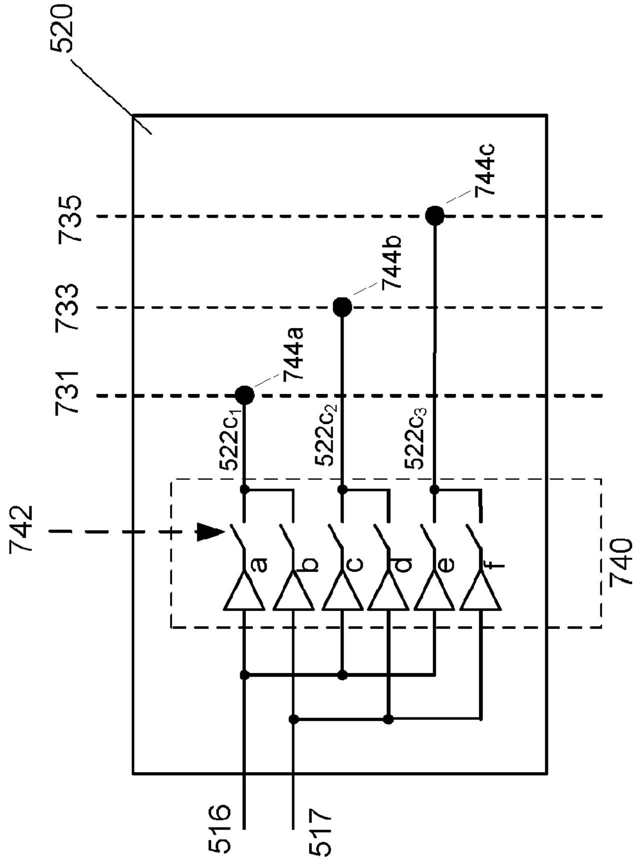
FIG. 7B illustrates an exemplary embodiment of an output switch in accordance with one embodiment of the present invention.

FIG. 7B illustrates an exemplary embodiment of an output switch in accordance with one embodiment of the present invention. Power and control signals (not shown in order to simplify the drawing) are routed to each of the components to activate and control the operating states of such components to perform the operations as described herein. The structure and operation of the output switch is described in terms of the 2×3 switch matrix 520 presented in FIGS. 3 and 7A, although the same components (or minor modifications thereof) may be employed in the construction and operation of any of the output switches described herein.

The switch includes inputs 516, 517, and outputs 522$c_1$-522$c_3$, and a bank of six, single-pole single-throw (SPST) switches 740*a-f*. Power signals (not shown in order to simplify the drawing) are routed to each of the components to activate and control the operating states of such components to perform the operations as described herein. In a specific embodiment of the invention, output switches 525, 720, and 725 are similarly configured as switch 520, although this is not necessary in all instances, and the translational switches output switches 520, 525, 720 and 725 may differ between them as to the number of inputs, number of outputs, or both.

As shown, each input 516, 517 is coupled to three of the six SPST switches 740*a-f*, which, responsive to a control signal 742, sets the states of each of the SPST switches 740*a-f*, so that any of the inputs 516,517 can be switched to any one, two, or all three outputs 522$c_1$-522$c_3$. Each of the SPST switch pairs (740*a,b*; 740*c,d*; 740*e,f*) are coupled together at their outputs, and these outputs coupled to the signal bus lines 731, 733 and 735, respectively; i.e. SPST pair 740*a,b* coupled to signal bus line 731 at nodes 744*a*, SPST pair 740*c,d* coupled to signal bus line 733 at nodes 744*b*, and SPST pair 740*e,f* coupled to signal bus line 735 at nodes 744*c*. Further particularly, the SPST switch pairs are controlled, so that both inputs 516, 517 are not supplied to the same output simultaneously. However, both inputs may be concurrently active to supply their inputs to different outputs.

FIG. 7C illustrates an exemplary layout of a signal bus line in accordance with one embodiment of the present invention. Power and control signals (not shown in order to simplify the drawing) are routed to each of the components to activate and control the operating states of such components to perform the operations as described herein. The structure and operation of the signal bus line is described in terms of the signal bus line 380 presented in FIGS. 3 and 7A, although the same components (or minor modifications thereof) may be employed in the construction and operation of the signal bus line described in FIGS. 10 and 12 below.

FIG. 7C shows an interleaved signal bus line arrangement, with signal bus lines 731, 733, 735 interleaved with bus lines 732, 734 and 736. The bus lines are shown on top of substrate 746 which has the ground plane at the bottom side. The bus lines 731-736 as well as the ground plane may be made of electrically conductive material, each bus line forming a signal transmission line (perpendicular to the drawing plane). It is well known in the art that the characteristic impedance and signal transmission properties of the lines are determined by the geometry and physical size of the structure, as well as the electrical properties, such as the dielectric constant of the substrate, conductive material type (e.g. copper, aluminum, conductive polymer), etc. Other embodiment of the bus structure may include multi-layer substrate with bus lines located at different layers, possibly with ground plane layers in-between to achieve desired properties, such as improved signal isolation, impedance levels, etc. Other components, such as passive discrete components (e.g. capacitors, inductors, resistors) installed on the top of the substrate along with the chip dice, or embedded/printed on different substrate layers can be utilized.

In this exemplary embodiment, switch 520 is illustrated as a discrete component (e.g. a flip-chip device) having conductive balls or bumps which serve to provide an interconnect between the switch outputs 522$c_1$-522$c_3$ and the bus lines 731, 733 and 735 (depicted by the darker bumps, thus completing the electrical connection at nodes 744*a-c*. The lighter shaded bumps are not connected to exemplary switch 520; they depict the bus connection to other die in the translator 301.

Figure 7D:
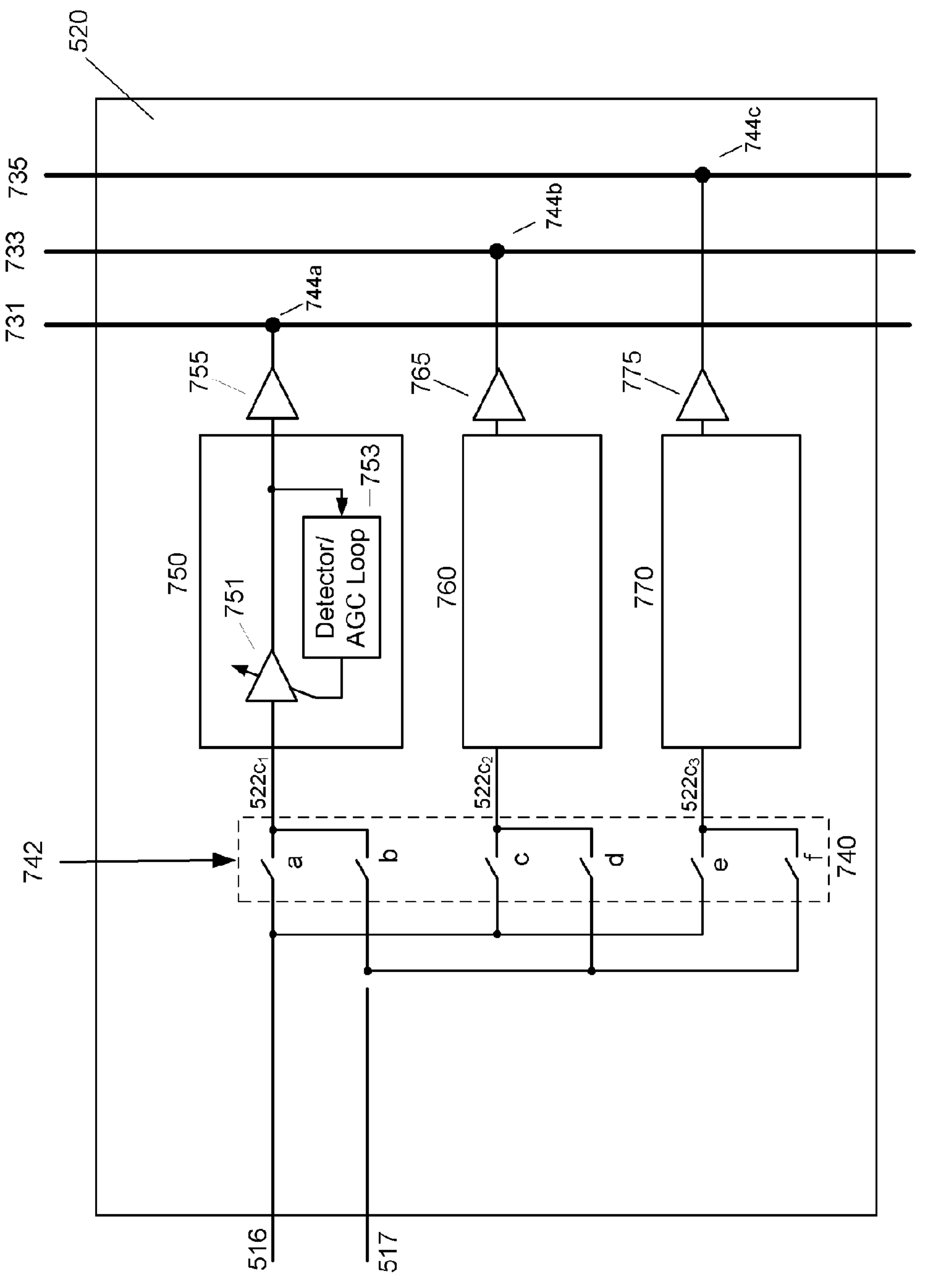
FIG. 7D illustrates an exemplary output switch employing automatic gain control in accordance with one embodiment of the present invention.

FIG. 7D illustrates an exemplary output switch employing automatic gain control in accordance with one embodiment of the present invention. Power and control signals (not shown in order to simplify the drawing) are routed to each of the components to activate and control the operating states of such components to perform the operations as described herein. The structure and operation of the output switch is described in terms of the 2×3 switch matrix 520 presented in FIGS. 3 and 7A-7C, although the same components (or minor modifications thereof) may be employed in the construction and operation of any of the output switches (e.g., 420, 425, 525, 720 and 725) described herein.

In an alternative technique of applying back-end AGC (i.e., post mixer stage AGC), an AGC function is inserted between the output switch 520 and the bus line 380. This AGC location provides further refinement of the level control, stabilizing the level at farther downstream point. The arrangement employs one AGC block per each bus line 781-786 (three bus lines shown 781-783), requiring a total of 6 blocks for a 6-wire bus example. In this illustrated embodiment, AGC blocks 750, 760 and 770 are coupled to respective signal bus line 731, 733 and 735. An exemplary construction of each AGC block 750, 760, and 770 includes a VGA 751 and detector and a loop amplifier/filter 753. Detector/loop arrangements similar to those described for AGC circuit 610 above can be deployed for the AGC circuit 640 as well. Further exemplary an output buffer (755, 765, and 775) is inserted between each AGC block and corresponding bus line in order to provide the bus driving function as well as to ensure sufficient isolation of the AGC and the switch circuitry from the bus. As described below, this buffer can be in the form of a voltage source or a current source, or the combination of the two.

Figure 7F:
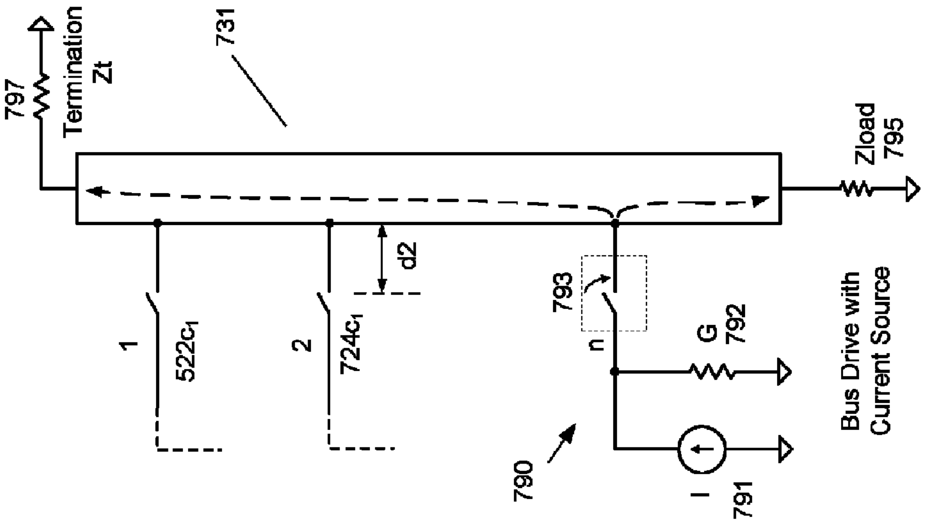
FIGS. 7E and 7F illustrate exemplary embodiments of driver circuits for signal bus lines in accordance with embodiments of the present invention.
Figure 7E:
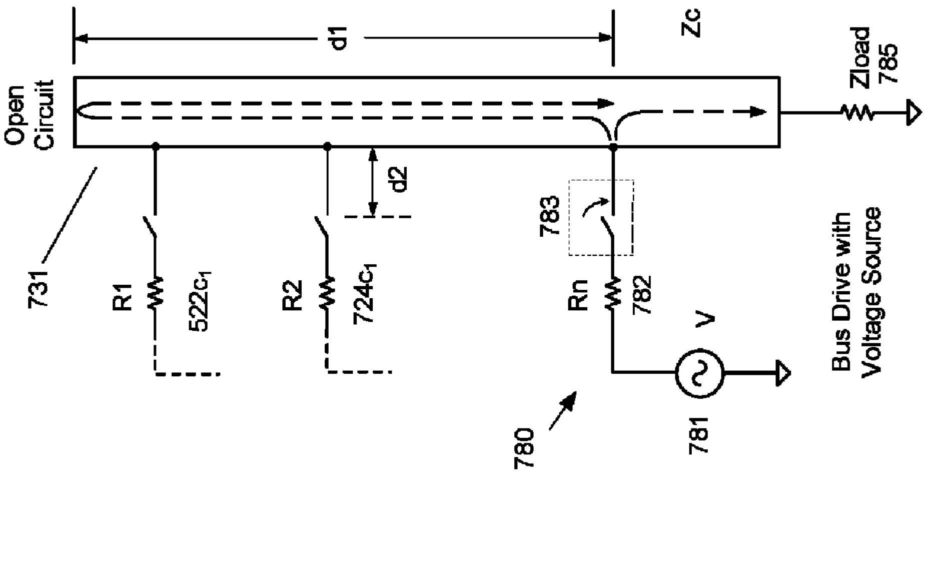

FIGS. 7E and 7F illustrate exemplary embodiments of driver circuits for signal bus lines in accordance with embodiments of the present invention. Power and control signals (not shown in order to simplify the drawing) are routed to each of the components to activate and control the operating states of such components to perform the operations as described herein. The structure and operation of the illustrated signal bus line is described in terms of the signal bus line 731 presented in FIGS. 3 and 7A-7D, although the same components (or minor modifications thereof) may be employed in the construction and operation of any of the signal bus lines described herein.

FIG. 7E illustrates a first exemplary driver circuit 780 for a signal bus 731, the drive circuitry 780 implementing a source 781 having an internal impedance Rn 782, the source 781 operable to signal bus line 731 via a controllable SPST switch 783. The signal bus line 731 is implemented in the form of a transmission line with a characteristic impedance Zc. Exemplary values for this impedance (and the resistance value of Rn) include 50 or 75 Ohms, although other impedances (higher or lower) may be employed as well. Signal bus line 731 is selectively coupled to an output of several output switches, for example, output 522*c*1 of output switch 520 and output 724*c*1 from output switch 720. The impedances of outputs 522*c*1 and 724*c*1 are shown as R1 and R2, respectively, although their impedances may be complex as well. In general, sources are substantially resistive but may include parasitics that result in a collective complex load impedance. In an exemplary embodiment consistent with FIGS. 7E and 7F, each bus line 731-736 has a dedicated driver circuit 780 with one source being operational and coupled to the bus at any one time; all other sources are decoupled and/or deactivated, e.g., their respective switches in the off position.

When a signal is launched from source 781 into the signal bus line 380, it splits two ways, one towards Zload 785 (i.e., the load of the bus line 731 and components coupled thereto, e.g., output line 391*a*, output filter 251) while the other travels to the opposite end of the line. The opposite end is open-circuited and the signal reflects back towards the load, as depicted by the dashed line. The electrical distance or electrical length traveled to the open circuited end one way is d1, and round trip back to the point of insertion is 2·d1. In an exemplary embodiment, the electrical roundtrip length of 2·d1 is designed such that it is smaller than the half-wavelength of the signal: 2·d1<<½ of the signal wavelength, in order to prevent cancellation (or reduction) of the signal power delivered to Zload due to phase reversal (or substantial phase shift). Further exemplary, the electrical length of the signal bus line 731 is designed to be much shorter than the quarter wave length of the signal (d1<<¼ of the signal wavelength). Because different switches couple into the bus line at different positions with respect to the open circuited end, minimizing the phase shift of the reflected signal to each of the switch positions by keeping the line short will prevent any significant difference between the signal level delivered to the load from any of the switch positions. The electrical distance between the switch and the bus, i.e. the electrical length d2 may also be designed such that it is much smaller than the quarter wavelength. Such a criterion aids to prevent the transformation of the impedance presented by the switch and voltage source into a different impedance as seen by the bus line. If length d2 electrically approaches a quarter wavelength, the open circuit switch impedance would appear as a low impedance, which could load the signal bus line 731. The source impedance Rn would be transformed into a different impedance, its value depending on the characteristic impedance of the physical interconnecting structure, as a transmission line connecting the switch to the bus. Both cases would cause a loss of signal power that is transferred to the load, increasing the insertion loss of the system and degrading performance. Further exemplary, the load impedance Zload is chosen so as to be substantially matched to the characteristic impedance Zc of the line, this condition allowing the maximum power transfer to the load.

A further advantage of shorter bus lines is reduced mutual coupling and improved signal isolation. As an example, a quarter wavelength of a 2 GHz signal propagating in a transmission medium of effective dielectric constant of 3.3 is about 20 mm. At this frequency, a physical size of bus and chip interconnect structures of a few millimeters should be adequate.

FIG. 7F illustrates a second exemplary driver circuit 790 for a signal bus line, the drive circuit 790 implementing a current source 791 having an internal source admittance G, the source 791 operable to drive signal bus line 731 via a controllable SPST switch 783. The signal bus line 731 is implemented in the form of a transmission line with a characteristic impedance Zc. Exemplary values for this impedance (and the resistance value of Rn) include 50 or 75 Ohms, although other impedances (lower or higher) may be employed as well. Signal bus line 731 is selectively coupled to an output of several output switches, for example, output 522*c*1 of output switch 520 and output 724*c*1 from output switch 720.

In this embodiment, the signal bus line 731 is terminated at both ends. A signal applied from the source 791 splits in two directions as shown by dashed lines, one traveling towards the load 795 (representing the load present on the output line 391*a*), and the other traveling to the opposite end of the line, where the signal portion gets absorbed by the termination load Zt 797. In one embodiment, the terminal impedance Zt 797 is chosen so as to be substantially equal to the characteristic impedance Zc of the signal bus line 731 to minimize signal reflections. Implementation of the load termination 797 enables the implementation of different length bus lines, although the aforementioned electrical length d2 remains sensitive to impedance transformation, and may be designed as noted above. An advantage of the driver circuit 790 is that when the switch is turned off, i.e. open, the switch favorably stays in the same high-impedance state (assuming the source 791 has a high G/admittance 792). The change of the impedance seen by the signal bus line 731 is small, thus the switching transients and post-switching static changes are minimized. To maximize the power transfer to the load, like in the previous case, the load impedance Zload 795 should be substantially matched to the characteristic impedance Zc of the line (or alternatively, the characteristic impedance of the line designed to match the load impedance Zload 795).

Figure 8:
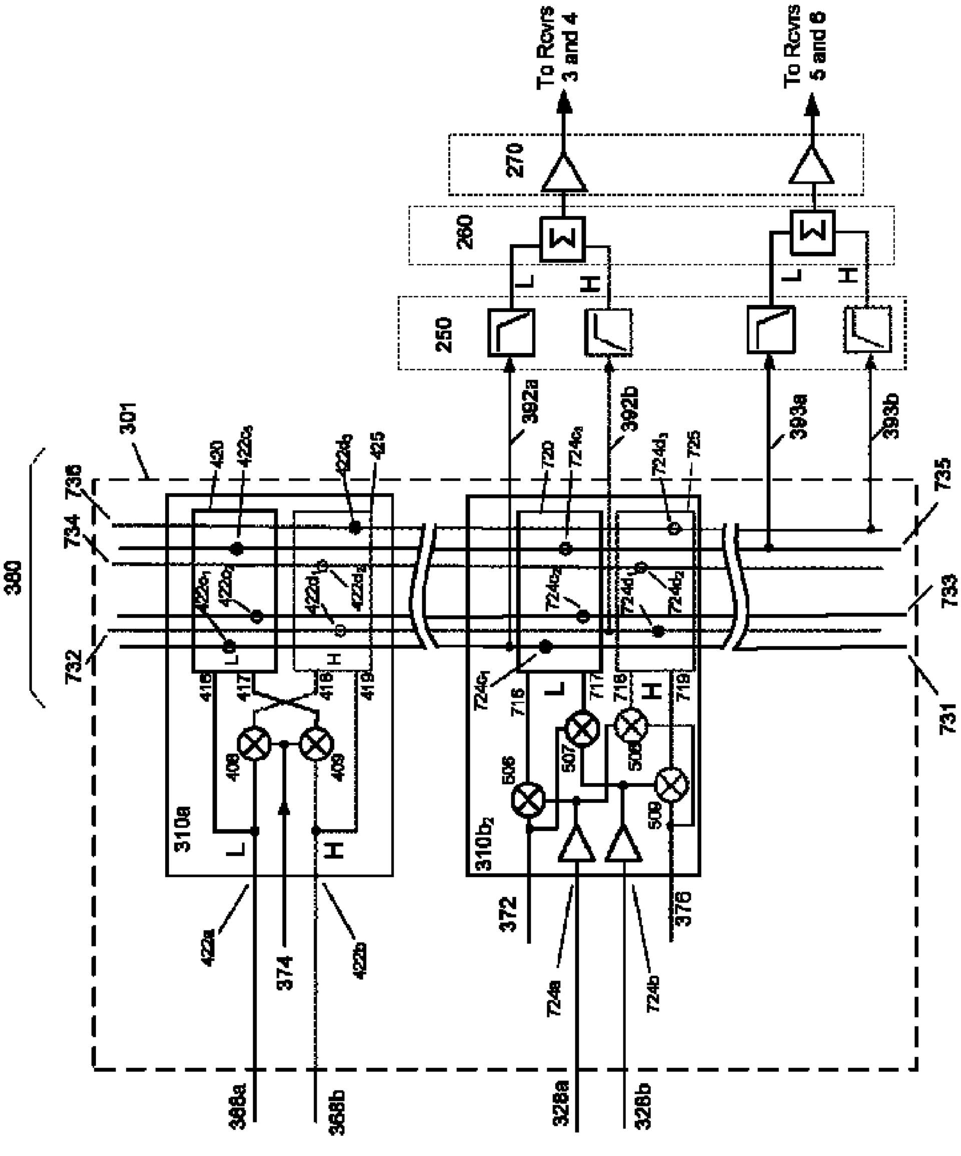
FIG. 8 illustrates a partial detailed view of the signal bus implemented within the translational switching system of FIG. 3.

FIG. 8 illustrates a detailed partial view of the signal bus implemented within the translator 301 of FIG. 3. The view represents a portion of the schematic shown in FIG. 3, and illustrates the signal bus 380 coupled between the partial translational switch 310*a* and the full translational switch 310$b_2$. Other features of the schematic are omitted to facilitate presentation and description of the illustrated features. Power and control signals (not shown in order to simplify the drawing) are routed to each of the components to activate and control the operating states of such components to perform the operations as described herein.

As shown, the translator 301 includes a first translational switch (shown as the partial translational switch 310*a* although in another embodiment the full translational switch 310$b_2$ may be implemented as the first translational switch, as described above), a second translational switch (shown as the full translational switch 310$b_2$), and a signal bus 380. The partial translational switch 310*a* includes one or more inputs (two shown, 422*a,b*) configured to receive a respective one or more first input signals (two shown 368*a,b*), a first plurality of outputs (three shown, 422$c_1$-422$c_3$), and a second plurality of outputs (three shown, 422$d_1$-422$d_3$). As noted, the first translational switch 310*a* is configured to switchably output a first frequency version of the first input signal (e.g., low L-band signal) to any of the first plurality of outputs 422$c_1$-422$c_3$, and to switchably output a second frequency version of the first input signal (e.g., low L-band signal) to any of the second plurality of outputs 422$d_1$-422$d_3$.

The second translational switch 310$b_2$ is as described previously in FIG. 7A, having one or more inputs 724*a,b* configured to receive a respective one or more second input signals 328*a,b*, a first plurality of outputs (three shown, 724$c_1$-724$c_3$), and a second plurality of outputs (three shown, 724$d_1$-724$d_3$). The second translational switch 310$b_2$ is configured to switchably output a first frequency version of the second input signal 328*a,b* to any of the first plurality of outputs 724$c_1$-724$c_3$, and to switchably output a second frequency version of the second input signal 328*a,b* to any of the second plurality of outputs 724$d_1$-724$d_3$. In an alternative embodiment, translational switch 310$b_1$ may be employed as the second translational switch.

The signal bus 380 is coupled between the first and second translational switches 310*a*, 310$b_2$, and includes at least a first bus line 731 and a second bus line 732. The first bus line 731 is selectively coupled to a first one of the first plurality of outputs (shown as output 422$c_1$) of the first translational switch 310*a*, and also to a first one of the first plurality of outputs (shown as output 724$c_1$) of the second translational switch 310$b_2$. The second bus line 732 is selectively coupled between a first one of the second plurality of outputs (shown as output 422$d_1$) of the first translational switch 310*a*, and to a first one of the second plurality of outputs (shown as output 724$d_1$) of the second translational switch 310$b_2$. Output switches 420 and 720 are collectively controlled to determine which of the outputs 422$c_1$ or 724$c_1$ is to be coupled to the first bus line 731. In the exemplary embodiment of FIG. 8 where hollow circles indicating a switchably-coupled, open connection, and a darkened circle indicating a switchably-coupled, closed connection, output 724$c_1$ of the full translational switch 310$b_2$ is coupled to the first bus line 731, and therethrough to the first output line 392*a*, and output 724$d_2$ of the full translational switch 310$b_2$ is coupled to the second bus line 732, and therethrough to the second output line 391*b*. The foregoing arrangement is merely exemplary, and other connection arrangements may be employed in alternative embodiments.

As further illustrated, the signal bus 380 includes at least third and fourth bus lines 733 and 734. The third bus line 733 is selectively coupled to a second one of the first plurality of outputs (shown as output 422$c_2$) of the first translational switch 310*a*, and to a second one of the first plurality of outputs (shown as output 724$c_2$) of the second translational switch 310$b_2$. The fourth bus line 734 is selectively coupled to a second one of the second plurality of outputs (shown as 422$d_2$) of the first translational switch 310*a* and to a second one of the second plurality of outputs (shown as output 724$d_2$, switched-open) of the second translational switch 310$b_2$. In this arrangement, the first and third bus lines 731, 733 are each operable to support the propagation of the first frequency version (e.g., the low L-band version) of the first or second input signals 368*a,b*, or 328*a,b*, and the second and fourth bus lines 732, 734 are each operable to support the propagation of the second frequency version (e.g., the upper/high L-band version) of the first or second input signals 368*a,b* or 328*a,b*. Further particularly, the first and third bus lines 731, 733 may be interleaved with the second and fourth bus lines 732, 734, thereby providing a degree of signal isolation between the two bus lines carrying the signal signals. In particular, at least one line of a different frequency is interposed between bus lines carrying signals at the same frequency.

As noted above, output switches 420, 425, 720 and 725 may be included within the respective translational switches 310*a* and 310$b_2$, or provided as discrete components therefrom, or be included within the signal bus 380. In the exemplary embodiment of FIG. 8 in which translational switch 310 includes output switches 420 and 425, respectively, output switch 420 includes first and second inputs 416 and 417 for receiving the first frequency version (low L-band signal "L") of the first input signal 368 (first signal portion 368*a* supplied to first input 416, and second signal portion 368*b* supplied to the second input 417), and a plurality of outputs 422$c_1$-422$c_3$. The second output switch 425 includes first and second inputs 418 and 419 for receiving a second frequency version (upper/high L-band signal "H") of the first input signal 368 (first signal portion 368*a* supplied to first input 418, and second signal portion 368*b* supplied to the second input 419), and plurality of outputs 422$d_1$-422$d_3$. In this particular embodiment, the non-translated version of signal 368*a* (externally supplied low L-band signal) serves as the first frequency version of signal 368*a* which is supplied to input 416, and the non-translated version of signal 368*b* (externally supplied high L-band signal) serves as the second frequency version of signal 368*b*.

The second translational switch 310$b_2$ includes output switches 720 and 725, the first output switch 720 including first and second inputs 716 and 717 for receiving a first frequency version (lower L-band signal "L") of the second input signal 328 (first signal portion 328*a* supplied to first input 716, and second signal portion 328*b* supplied to the second input 717), and a plurality of outputs 724$c_1$-724$c_3$.

The second output switch 725 includes first and second inputs 718 and 719 for receiving the second frequency version (upper/high L-band signal "H") of the second input signal 328 (e.g., first signal portion 328*a* supplied to first input 718, and second signal portion 328*b* supplied to the second input 719), and the plurality of outputs 724*d*$_1$-724*d*$_3$.

In the exemplary embodiment of FIG. 8, signal bus 380 includes bus lines 731-736, bus lines 731, 733, and 735 operable to route the first frequency version (e.g., the low L-band signal version) of either the first or second signals 368 or 328 to any of the output lines 392*a* or 393*a*. Similarly, bus lines 732, 734, and 736 operate to route the second frequency version (e.g., the upper L-band signal version) of either the first or second signals 368 or 328 to any of the output lines 392*b* or 393*b*. In particular, bus line 731 is shown coupled to output 724*c*$_1$ and output line 392*a*, thus supplying receivers 3 and 4 with the first frequency version of the second input signal 328 (either signal 328*a* or 328*b* as selected by switch 720). Bus line 732 is shown coupled to output 724*d*$_1$ and output line 392*b*, thus supplying receivers 3 and 4 with the second frequency version of the second input signal 328 (either signal 328*a* or 328*b* as selected by switch 720). Bus line 735 is shown coupled to output 422*c*$_3$ and output line 393*a*, thus supplying receivers 5 and 6 with the first frequency version of the first input signal 368 (either signals 368*a* or 368*b* as selected by switch 420). Bus line 736 is shown coupled to output 724*d*$_3$ and output line 393*b*, thus supplying receivers 5 and 6 with the second frequency version of the first input signal 368 (either signal 368*a* or 368*b* as selected by switch 420). As noted above, the first and second versions of the input signals may be supplied to alternating bus lines, so as to improve signal isolation between lines carrying the same frequency signals. Similarly, the signal bus 380 may be made operable to supply the first and second versions of the input signals to alternating output lines to improve signal isolation.

Figure 9:
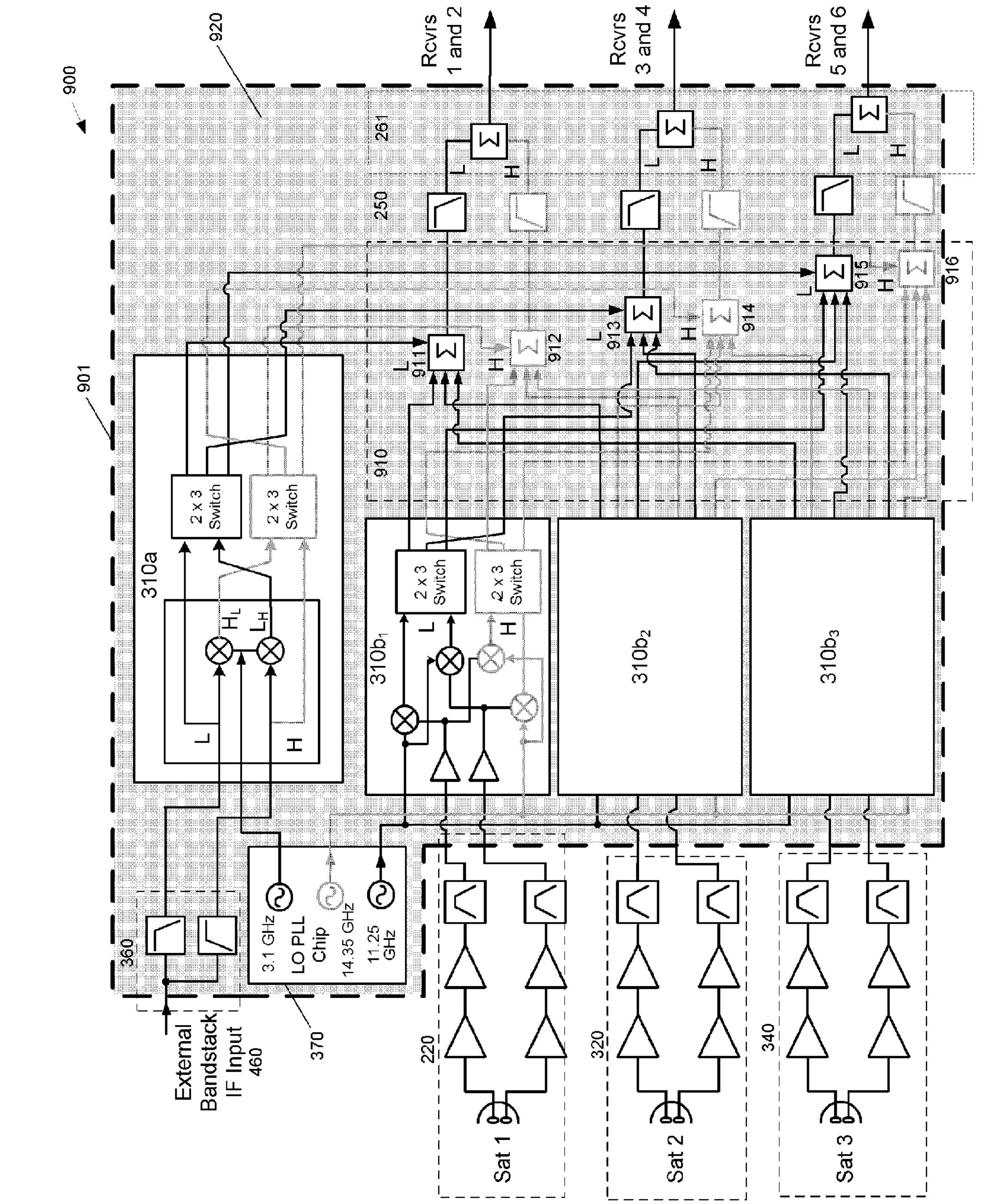
FIG. 9 illustrates a third exemplary system for constructing a composite signal in accordance with one embodiment of the present invention.

FIG. 9 illustrates a third exemplary system 900 for constructing a composite signal in accordance with one embodiment of the present invention. The system 900 includes the previously-described receive modules 220, 320, 340, and 360, and a new frequency translation system ("translator") 901 implementing the previously-described components of the reference source 370, the partial and full translational switches 310*a*, 310*b*$_1$, 310*b*$_2$, 310*b*$_3$, optional filters 250, and signal combiners 260, along with a new signal combiner network 910. Power and control signals (not shown in order to simplify the drawing) are routed to each of the components to activate and control the operating states of such components to perform the operations as described herein.

In comparison to the bus-based architectures shown in FIGS. 3, 7A, and 8, the translator 901 is based on signal combination architecture. This architecture may provide benefits in particular implementations in which the signal lines can be isolated from each other. For example, the translator 901 may be formed from multilayer board 920 in which signals are formed on different layers to improve line-to-line isolation. Other substrate materials may be used to provide similar isolation improvement.

Signal combiner network 910 includes six signal combiners 911-916, three signal combiners 911, 913, and 915 operable to receive each of the first frequency versions (e.g., the low L-band "L") of the input signals 228, 328, 348, and 368, and three signal combiners 912, 914, and 916 operable to receive each of the second frequency versions (e.g. the upper/high L-band "L") of the input signals 228, 328, 348 and 368. As shown, each of the translator output lines may be alternating arranged such that adjacent lines carry two different frequency signals.

The output of each of the six signal combiners 911-916 is coupled (via optional filters 250) to one of two inputs of signal combiners 261, or 262, or 263. Assembly of the composite signal having first and second frequency versions of the input signals 228, 328, 348, and 368 are as described previously.

Figure 10:
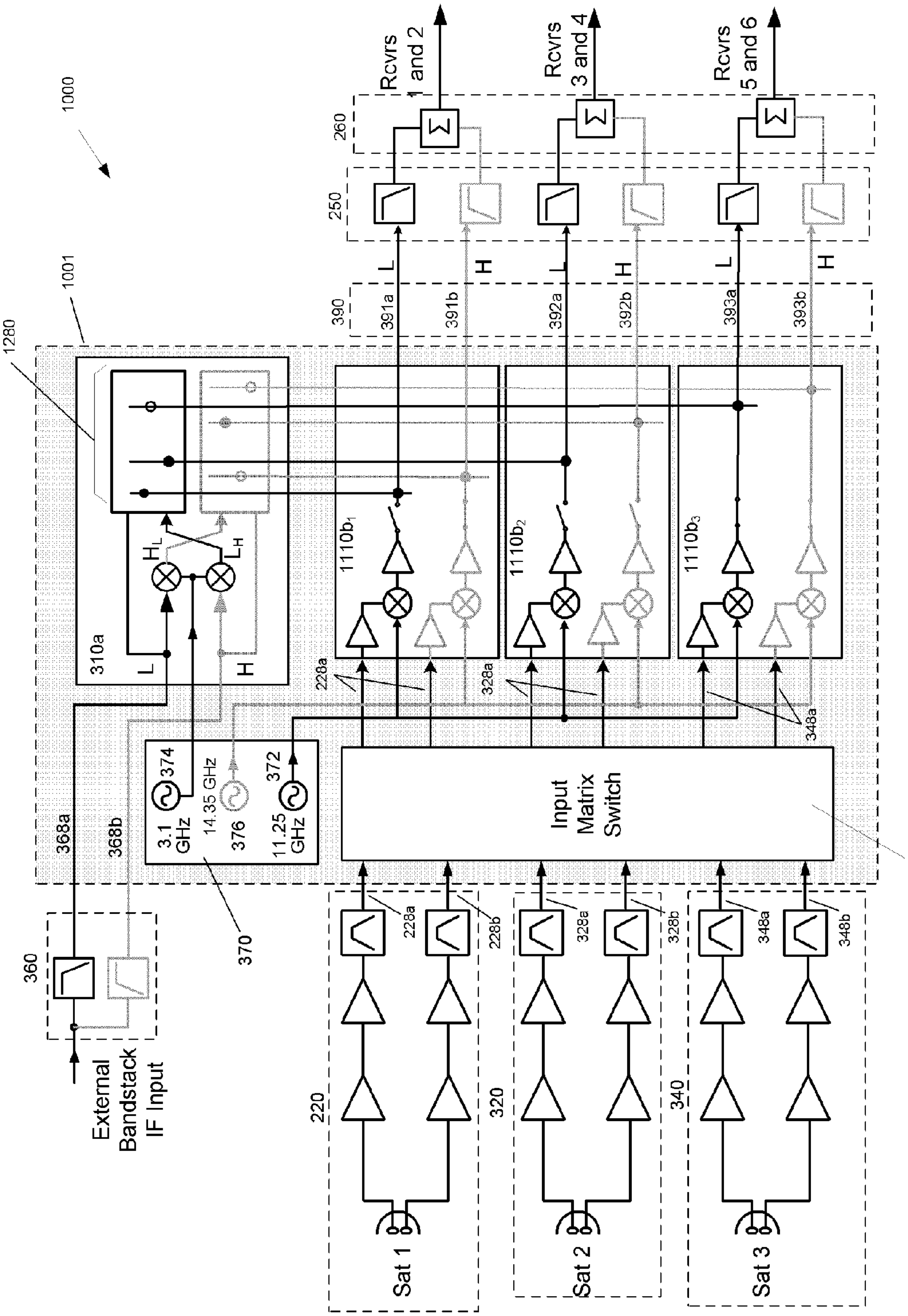
FIG. 10 illustrates a fourth exemplary system for constructing a composite signal in accordance with one embodiment of the present invention.

FIG. 10 illustrates a fourth exemplary system 1000 for constructing a composite signal in accordance with one embodiment of the present invention. The system 1000 includes the previously-described receive modules 220, 320, 340, and 360, and a new frequency translation system ("translator") 1001 implementing the previously-described components of the reference source 370, and the partial translational switch 310*a*, along with new full translation switches 1101*b*$_1$, 1101*b*$_2$, and 1101*b*$_3$, a new signal bus 1280, and a new input switch matrix 1120. Output lines 390, optional filters 250, and signal combiners 260 are illustrated outside of the translator 1001, although in other embodiments these components may be included within the structure of the translator 1001. Power and control signals (not shown in order to simplify the drawing) are routed to each of the components to activate and control the operating states of such components to perform the operations as described herein.

In comparison to the back-end switched architectures shown in FIGS. 3, 7A, and 8, the translator 1001 is based on a front-end switched architecture. This architecture provides benefits in requiring fewer mixers within the full translational switches 1101*b*$_1$, 1110*b*$_2$, 1110*b*$_3$, resulting in a lower component count, cost, and power consumption of the translator 1001.

Each translational switch 110*b*$_1$-1110*b*$_3$ operates to provide a frequency version of the signals received. The operation of system 1000 differs from the systems 300 and 900 shown in FIGS. 3 and 9, respectively, in that in system 1000, any signal (or signal component) may be applied to any translational signal input, via the input switch matrix 1120. Control as to what signal (or signal component of a received signal) is to be processed in system 1000 is made through control of input switch 1120, and through control of the output switches in the partial translational switch 310*a*, as will be further described below. In systems 300 and 900 control as to what signal (or signal component) is to be processed is made using the output switches of the translational switches.

The input switch matrix 1120 is a 6×6 switch matrix, operable to switchably couple any of the six inputs to any one or more of the six outputs. In a particular embodiment, the input switch 1120 is operable at RF frequencies, for example in the Ku- or Ka-bands described herein. Further particularly, the reference source 370, translational switches 310*a*, 1110*b*$_1$-1110*b*$_3$, and the input switch matrix 1120 may be integrated with the same package/substrate, e.g. a Si, SiGe, or GaAs IC. Further optionally, the translator 1001 may be constructed in a system-in-package (SIP) form, in which translational switches 310*a* and 1110*b*$_1$-1110*b*$_3$, switch matrix 1120, and frequency source 370 are implemented as discrete circuits of dice/ICs interconnected via a routing plane on a substrate, such as a printed circuit board and assembled in a separate package.

To facilitate the understanding of the system 1000, one of signals 228*a,b* output from the first receive module 220 is shown as being switched to either of the inputs of full translational switch 1110*b*$_1$, e.g., each input of translational switch 1110*b*$_1$ receives signal component 228*a*. Similarly, signal component 328*a* is shown as being applied to both of the two inputs of full translational switch 1110*b*$_2$, and signal components 348*a* is shown as being applied to both of the two inputs of full translational switch 1110*b*$_3$. This output signal arrangement is only exemplary, and those skilled in the art will appreciate that the input switch matrix 1120 may be controlled to provide any of its input signals to any one or more of its output ports. The structure and operation of the translational switches 1110$b_1$-1110$b_3$ is described in further detail in FIG. 11.

Further exemplary of the translator 1001 is a signal bus 1280, which couples to each translational switch 310$a$ and 1110$b_1$-1110$b_3$. The construction and operation of the signal bus 1280 is further described in FIG. 12, but in general the signal bus 1280 operates to selectively couple any of the H or L signals of the partial translational switch 310$a$ and any one of the full translational switches 1110$b_1$-1110$b_3$ to any one of the output lines 390 (hollow circles indicating a controllable or selectively-coupled connection that is presently open, and a darkened circle indicating a selectively-coupled connection that is presently closed/made).

In the exemplary arrangement of FIG. 10, each output line 391$a$, 392$a$, and 393$a$ is selectively coupled to receive a respective one of the low L-band signals provided by either the partial translational switch 310$a$ and one of the full translational switches 1110$b$, and each output line 391$b$, 392$b$, 393$b$ is selectively coupled to receive a respective one of the high L-band signals provided by either the partial translational switch 310 or one of the full translational switches 1110$b$. The process by which each of the translational switch outputs is selectively coupled to the output lines 390 will be described in FIG. 12, but in general, the state of the output switches 420 and 425 within the partial translational switch 310$a$ and the SPST switches 1113 and 1114 within each of the full translational switches are collectively controlled to determine which couples its respective signal to the each of the bus lines 1281-1286.

As shown in FIG. 10, the first and second versions of the input signals may be supplied to alternating bus lines, so as to improve signal isolation between lines carrying the same frequency signals. Similarly, the signal bus 1280 may be operable to supply the first and second versions of the input signals to alternating output lines 390 to improve signal isolation. Collectively, the output lines 391$a,b$, 392$a,b$ and 393$a,b$ are arranged such that each receiver (via signal combiner 261, or 262, or 263) is supplied with any one of a low L-band signal and any one of a high L-band signal. In this manner, each receiver can independently receive a composite signal formed by any one of the low L-band signals and any one of the high L-band signals. Of course, information included within each of the low and high L-band signals, e.g., one or more television channels, could thus be supplied to any receiver of the system 1000, independent of the television channel(s) (i.e., the composite signal) delivered to another receiver of the system.

Figure 11:
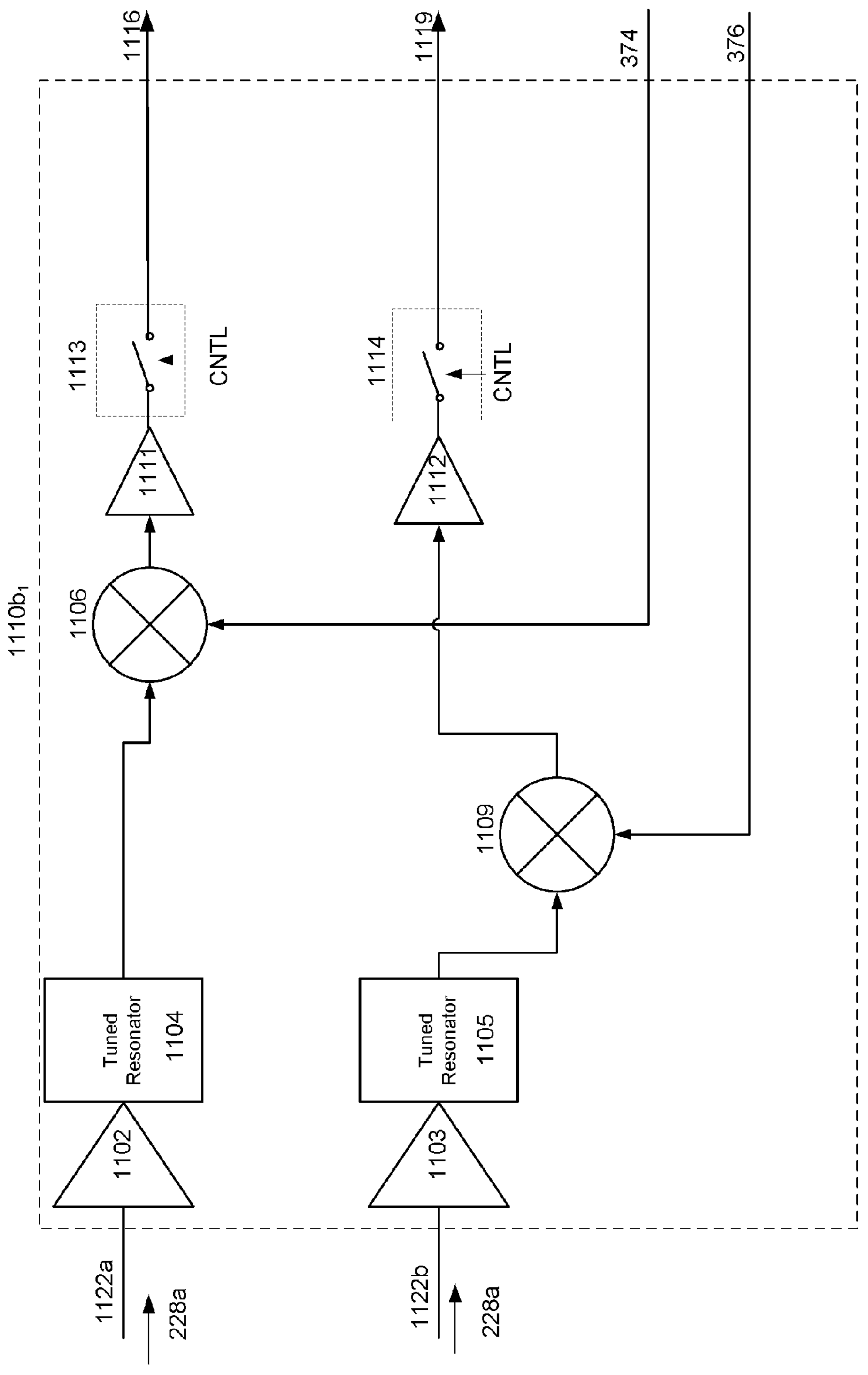
FIG. 11 illustrates an exemplary embodiment of the full translational switch shown in FIG. 10.

FIG. 11 illustrates an exemplary embodiment of the translational switch 1110$b_1$ shown in FIG. 10. In a specific embodiment of the invention, translational switches 1110$b_1$, 1110$b_2$ and 1110$b_3$ are identically constructed, although this is not necessary in all instances, and the translational switches 1110$b$ may differ between them as to the number of inputs, number of outputs, or both. The power and control signals (not shown in order to simplify the drawing) are routed to each of the components to activate and control the operating states of such components to perform the operations as described herein.

The full translational switch 1110$b_1$ includes first and second inputs 1122$a$ and 1122$b$ for receiving first and second signals (shown exemplary as the same signal 228$a$) an output port 1116 for providing a first frequency version of the received signal 228$a$, and output port 1119 for providing a second frequency version of the received signal 228$a$.

Internally within the full translational switch 1110$b_1$, the received signal 228$a$ is processed. Along different branches, signal component 228$a$ is supplied to an amplifier (e.g., a low noise amplifier) 1102, 1103 and a tuned resonator 1104, 1105, the resultant signals supplied to mixers 1106 and 1109, respectively. A first frequency version of signal 228$a$ is generated by mixer 1106, optionally amplified by amplifier 1111, and switchably coupled to the output 1116 via a SPST switch 1113. A second frequency version of signal 228$a$ is generated by mixer 1109, optionally amplified by amplifier 1112, and switchably coupled to the output 1119 via a SPST switch 1114. Mixer 1106 is supplied with reference signal from source 372, 11.25 GHz in an exemplary embodiment, and mixer 1109 is supplied with reference signal from source 376, a signal operating at 14.35 GHz in the exemplary embodiment.

Figure 12:
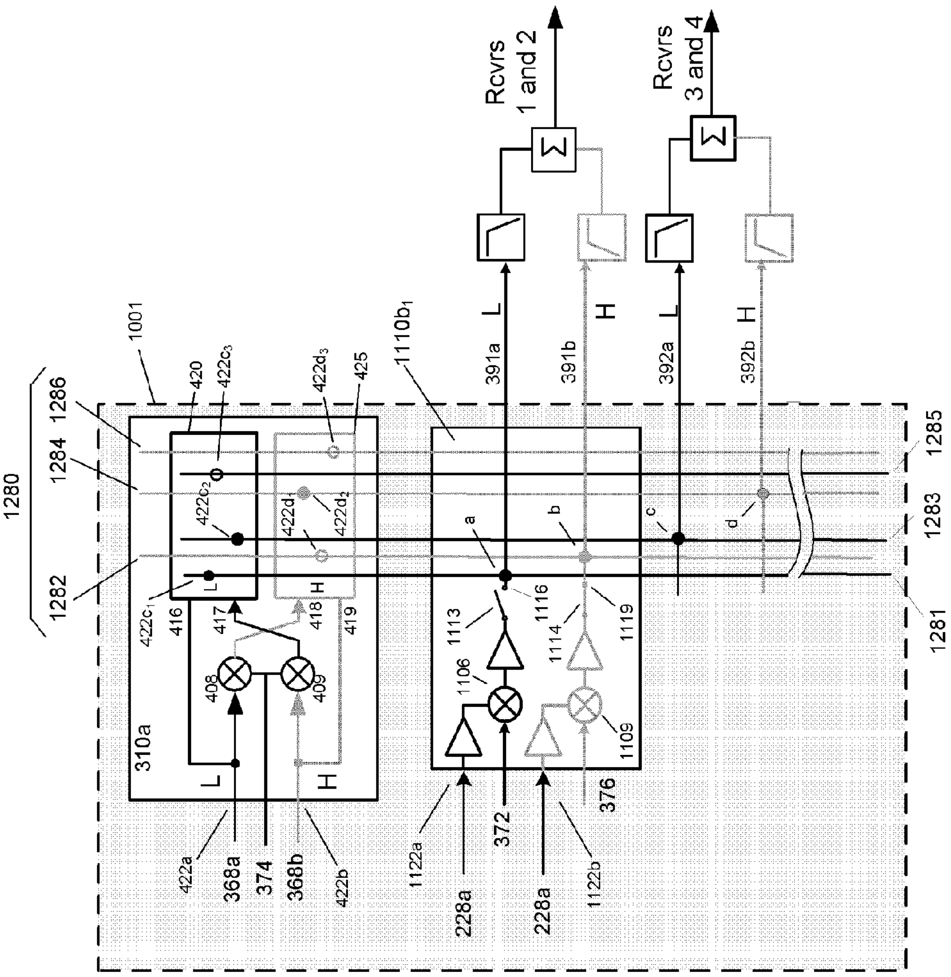
FIG. 12 illustrates a partial detailed view of the signal bus implemented within the translational switching system of FIG. 10.

FIG. 12 illustrates a partial detailed view of the signal bus implemented 1280 within the translator 1001 of FIG. 10. The view represents a portion of the schematic shown in FIG. 10, and illustrates the signal bus 1280 coupled between the partial translational switch 310$a$ and the full translational switch 1110$b_1$. Other features of the schematic are omitted to facilitate presentation and description of the illustrated features. Power and control signals (not shown in order to simplify the drawing) are routed to each of the components to activate and control the operating states of such components to perform the operations as described herein.

The translator 1001 includes a first translational switch (shown as the partial translational switch 310$a$ although in another embodiment, one of the full translational switches 1110$b_1$-1110$b_3$ may be implemented as the first translational switch), a second translational switch (shown as the full translational switch 1110$b_1$), and a signal bus 1280. The partial translational switch 310$a$ includes one or more inputs (two shown, 422$a,b$) configured to receive a respective one or more first input signals (two shown 368$a,b$), a first plurality of outputs (three shown, 422$c_1$-422$c_3$), and a second plurality of outputs (three shown, 422$d_1$-422$d_3$). The first translational switch 310$a$ is configured to switchably output a first frequency version of the first input signal (e.g., low L-band signal) to any of the first plurality of outputs 422$c_1$-422$c_3$, and to switchably output a second frequency version of the first input signal (e.g., low L-band signal) to any of the second plurality of outputs 422$d_1$-422$d_3$.

The second translational switch 1110$b_1$ is as described previously in FIG. 11, having one or more inputs 1122$a,b$ configured to receive a respective one or more second input signals (shown as signal component 228$a$) a first output 1116, and a second output 1119. The second translational switch 310$b_1$ is configured to switchably output a first frequency version of the second input signal 228 (particularly, signal portion 228$a$) to its output 1116, and to switchably output a second frequency version of the second input signal 228 (particularly, signal portion 228$a$) to its second output 1119.

The signal bus 1280 is coupled between the first and second translational switches 310$a$, 1110$b_1$, and includes at least a first bus line 1281 and a second bus line 1282. The first bus line 1281 is selectively coupled to a first one of the first plurality of outputs (shown as output 422$c_1$) of the first translational switch 310$a$, and coupled (shown as a fixed connection) to the first output line 391$a$ at node a. The first output 1116 of the second translational switch 1110$b_1$ is switchably coupled, via SPST 1113 to the first frequency version path of the second translational switch 1110$b_1$. In this arrangement, a first frequency version (e.g., a low L-band version) of either the first or second signals 368 or 228 may be supplied to the first output signal 391*a* (the first frequency version of signal component 228*b* available for coupling to output line 391*a* when the input switch matrix 1120 switchably couples signal component 228*b* to the inputs of translational switch 1110*$b_1$*). Particularly, switches 420 and 1113 are collectively controlled to determine which of the outputs 422*$c_1$* or 1116 is to be coupled to the first bus line 731. In the exemplary embodiment of FIG. 12 where hollow circles indicating a switchably-coupled, open connection, and a darkened circle indicating a switchably-coupled, closed connection, output 522*$c_1$* of the full translational switch 310*$b_1$* is coupled to the first bus line 731, and therethrough to the first output line 391*a*, and switch 1113 of the full translational switch 1110*$b_1$* is open. Alternatively or in addition, mixer 1106 and any optional circuitry (amplifiers, active filters, etc.) may be deactivated to minimize power consumption.

The second bus line 1282 is coupled in a similar manner, the second bus line 1282 selectively coupled to a first one of the second plurality of outputs (shown as output 422*$d_1$*) of the first translational switch 310*a*, and coupled (shown as a fixed connection) to the second output line 391*b* at node b. The second output 1119 of the second translational switch 1110*$b_1$* is switchably coupled, via SPST 1114 to the second frequency version path of the second translational switch 1110*$b_1$*. In this arrangement, a second frequency version (e.g., a high L-band version) of either the first or second signals 368 or 228 may be supplied to the second output signal 391*b* (the second frequency version of signal component 228*b* available for coupling to output line 391*b* when the input switch matrix 1120 switchably couples signal component 228*b* to the inputs of translational switch 1110*$b_1$*). Particularly, switches 425 and 1114 are collectively controlled to determine which of the outputs 422*$d_1$* or 1119 is to be coupled to the second bus line 732. In the exemplary embodiment of FIG. 12 where hollow circles indicate a switchably-coupled, open connection, and a darkened circle indicating a switchably-coupled, closed connection, output 1119 of the full translational switch 1110*$b_1$* is coupled to the second bus line 732, and therethrough to the second output line 391*b*, and the output switch 425 of the full translational switch 1110*$b_1$* provides no connection (i.e., the aforementioned null signal/state) to output 422*$d_1$*. The foregoing arrangement is merely exemplary, and other connection arrangements may be employed in alternative embodiments.

As further illustrated, the signal bus 1280 includes at least third and fourth bus lines 1283 and 1284. The third bus line 1283 is selectively coupled to a second one of the first plurality of outputs (shown as output 422*$c_2$*, switchably-coupled closed) of the first translational switch 310*a*, and to the third output line 392*a* at node c. The fourth bus line 1284 is selectively coupled to a second one of the second plurality of outputs (shown as 422*$d_2$*, switchably-coupled closed) of the first translational switch 310*a* and to the fourth output lines 392*b* at node d. As shown in FIG. 10, the first and second outputs of the full translational switch 1110*$b_2$* are decoupled from nodes c and d, as their respective SPST switches are controlled to an open state. In this arrangement, the first and third bus lines 1281, 1283 are each operable to support the propagation of the first frequency version (e.g., the low L-band version) of the first or second input signals 368*a,b*, or 228*a,b*, and the second and fourth bus lines 1282, 1284 are each operable to support the propagation of the second frequency version (e.g., the upper/high L-band version) of the first or second input signals 368*a,b* or 228*a,b*. Further particularly, the first and third bus lines 1281, 1283 may be interleaved with the second and fourth bus lines 1282, 1284, thereby providing a degree of signal isolation between the two bus lines carrying signals of the same frequency band. In particular, at least one line of a different frequency is interposed between bus lines carrying signals at the same frequency.

Figure 13:
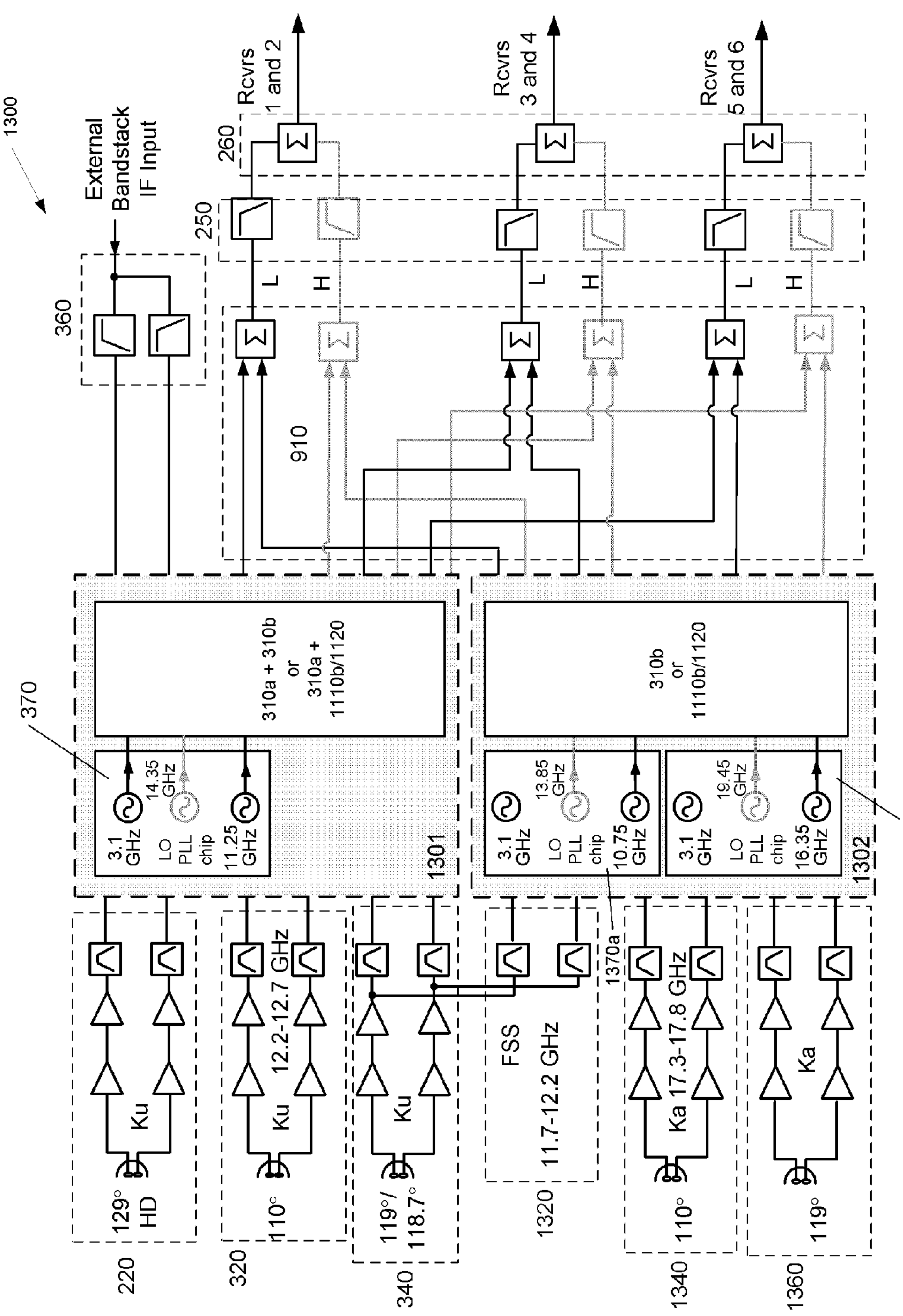
FIG. 13 illustrates a fifth exemplary system for constructing a composite signal in accordance with one embodiment of the present invention.

FIG. 13 illustrates a fifth exemplary system 1300 for constructing a composite signal in accordance with one embodiment of the present invention. The system 1300 includes two frequency translation systems (translators) 1301 and 1302. The first translator 1301 is coupled to the previously-described receive modules 220, 320, 340, and 360, and implements the previously described reference source 370 and either: (i) the set of translational switches illustrated in FIGS. 3-5 and 7-8 implementing the partial translational switch 310*a* and back-end switched full translational switches 310*$b_1$*-310*$b_3$*, or (ii) the set of translational switches illustrated in FIGS. 10-12 implementing the partial translational switch 310*a* and front-end switched full translational switches 1110*$b_1$*-1110*$b_3$* with the input switch matrix 1120 (a combination of these two sets also being implemented in an alternative embodiment). The second translator 1302 is coupled to new receive modules 1320, 1340, and 1360, implements two modified versions of reference source 370 (1370*a*, 1370*b*), and either: (i) the set of translational switches illustrated in FIGS. 3-5 and 7-8 implementing the back-end switched full translational switches 310*$b_1$*-310*$b_3$*, or (ii) the set of translational switches illustrated in FIGS. 10-12 implementing the front-end switched full translational switches 1110*$b_1$*-1110*$b_3$* with the input switch matrix 1120 (a combination of these two sets also being implemented in an alternative embodiment). Signal combiner network 910, optional filters 250, and signal combiners 260 are illustrated outside of the translator 1001, although in other embodiments portions of all of these components may be included within the structures of the two translators 1301 and 1302. While the signal combiner network 910 is shown, the multiple translator system 1300 may implement a signal bus similar to that described in FIGS. 3, 7A, 8, 10, and 12. Power and control signals (not shown in order to simplify the drawing) are routed to each of the components to activate and control the operating states of such components to perform the operations as described herein.

The multi-translator system employs two translational switch systems 1301 and 1302 to process different sets of input signal frequencies. In the exemplary embodiment shown, the first translational switch system 1301 operates to received Ku-band signals using a first set of reference signals operating at 11.25 GHz (for low L-band translation), and 14.35 GHz (for high L-band translation). A third reference signal operable at 3.1 GHz is supplied to the partial translational switch 310*a* within the first translator.

The second translational switch system 1302 employs two sets of reference signals. The first set of signals operate at 3.1 GHz (for partial translation switch operation), 10.75 GHz (for low L-band translation), and 13.85 GHz (for high L-band translation) to enable translation to the upper and lower L-bands of received signals operating within the Ku fixed service satellite (FSS-US) band of 11.7 GHz-12.2 GHz. The second set of signals operate at 3.1 GHz (for partial translation switch operation 310*a*), 16.35 GHz (for low L-band translation), and 19.45 GHz (for high L-band translation) to enable translation to the upper and lower L-bands of received signals operating within the Ka-band of 17.3 GHz-17.8 GHz. While FIG. 13 illustrates a two translator system, the skilled person will draw from the present invention that any number of translators may be coupled in parallel, for example, 3, 4, 6, 8, 10, or more.

Blocks 370, 1370*a,b* as earlier described provide reference signals, i.e. local oscillator LO signals required by the mixers for the conversion function. As shown, the frequency translation systems 1301 and 1302 each may be constructed in a system-in-package (SIP) form, in which translational switches and frequency sources of each system are implemented as discrete circuits or dice/ICs interconnected via a routing plane on a substrate, such as a printed circuit board and assembled in a separate package.

As taken from the exemplary embodiments above, a translational switch system of the present invention includes first and second translational switches, and a signal bus coupled therebetween. The first translational switch includes one or more inputs configured to receive a respective one or more first input signals, a first plurality of outputs, and a second plurality of outputs, the first translational switch configured to switchably output a first frequency version of the first input signal to any of the first plurality of outputs, and to switchably output a second frequency version of the first input signal to any of the second plurality of outputs. Particular embodiments of the first translation switch include a "partial" translational switch such as 310*a*, exemplary embodiments of which are shown in FIGS. 3, 4, 6A, 8-10, 12 and 13 illustrated and described below, and a "full" translational switch such as 310*b*1, exemplary embodiments of which are shown in FIGS. 3, 5, 6B, 7A, 9, and 13 shown above.

The second translational switch includes one or more inputs configured to receive a respective one or more second input signals, a first output (i.e., at least one first output), and a second output (i.e., at least one second output), the second translational switch configured to switchably output a first frequency version of the second input signal to the first output, and to switchably output a second frequency version of the second input signal to the second output. An exemplary embodiment of the second translational switch includes 1110*b*$_1$, which implements a single first output 1116, and a single second output 1119), further described in FIG. 11 below. Another exemplary embodiment of the second translational switch includes 310*b*$_2$ illustrated in FIGS. 3, 6B, 7A, 8-10, and 13. In this embodiment, each of the first and second outputs of the second translational switch are included within a group of first and second outputs.

The signal bus, coupled between the first and second translational switches, includes at least: (i) a first bus line coupled to a first one of the first plurality of outputs of the first translational switch, and to the first output of the second translational switch, and (ii) a second bus line coupled to a first one of the second plurality of outputs of the first translational switch, and to the second output of the second translational switch. In a further embodiment of the invention, the signal bus includes third and fourth signal bus lines. In one embodiment in which the second translational switch includes a single first output and a single second output, as exemplified by translational switch 1110*b*$_1$ in FIG. 11, the third bus line is coupled to a second one of the first plurality of outputs of the first translational switch, and to a first output of a third translational switch (1110*b*$_2$). Similarly, the fourth bus line is coupled to a second one of the second plurality of outputs of the first translational switch and to a second output of the third translational switch (1110*b*$_2$). In another embodiment in which the second translational switch includes a group of first outputs and a group of second outputs, as exemplified by the full translational switch 310*b*$_2$ in FIG. 8, the aforementioned first output of the second translational switch serves as one of a plurality of first outputs, and similarly the second output operates as one of a plurality of second outputs. The third bus line is arranged coupled to a second one of the first plurality of outputs of the first translational switch, and to a second one of the first plurality of outputs of the second translational switch. The fourth bus line is coupled to a second one of the second plurality of outputs of the first translational switch and to a second one of the second plurality of outputs of the second translational switch.

As readily appreciated by those skilled in the art, the described processes may be implemented in hardware, software, firmware or a combination of these implementations as appropriate. In addition, some or all of the described processes may be implemented as computer readable instruction code resident on a computer readable medium, the instruction code operable to program a computer of other such programmable device to carry out the intended functions. The computer readable medium on which the instruction code resides may take various forms, for example, a removable disk, volatile or non-volatile memory, etc., or a carrier signal which has been impressed with a modulating signal, the modulating signal corresponding to instructions for carrying out the described operations.

The terms "a" or "an" are used to refer to one, or more than one feature described thereby. Furthermore, the term "coupled" or "connected" refers to features which are in communication with each other (electrically, mechanically, thermally, as the case may be), either directly, or via one or more intervening structures or substances. The sequence of operations and actions referred to in method flowcharts are exemplary, and the operations and actions may be conducted in a different sequence, as well as two or more of the operations and actions conducted concurrently. Reference indicia (if any) included in the claims serve to refer to one exemplary embodiment of a claimed feature, and the claimed feature is not limited to the particular embodiment referred to by the reference indicia. The scope of the claimed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A translational switch system, comprising:

a first translational switch having one or more inputs configured to receive a respective one or more first input signals, a first plurality of outputs, and a second plurality of outputs, the first translational switch configured to switchably output a first frequency version of the first input signal to any of the first plurality of outputs, and to switchably output a second frequency version of the first input signal to any of the second plurality of outputs;

a second translational switch having one or more inputs configured to receive a respective one or more second input signals, a first output, and a second output, the second translational switch configured to switchably output a first frequency version of the second input signal to the first output, and to switchably output a second frequency version of the second input signal to the second output; and a signal bus coupled between the first and second translational switch, the signal bus having a first bus line coupled to a first one of the first plurality of outputs of the first translational switch, and to the first output of the second translational switch and a second bus line coupled to a first one of the second plurality of outputs of the first translational switch, and to the second output of the second translational switch.

2. The translational switch system of claim 1, wherein the first translation switch is configured to switchably output, on any of the first plurality of outputs, either a first frequency version of any one of the first input signals, or a null output signal, the first translational switch further configured to switchably output on the second plurality of outputs either a second frequency version of any one of the first input signals, or a null output signal.

3. The translational switch system of claim 1, wherein the first input signal has a plurality of signals including at least a first signal and a second signal, and wherein the first translational switch has a first output switch having a first input for receiving the first frequency version of the first signal, a second input for receiving the first frequency version of the second signal, and a plurality of outputs and a second output switch having a first input for receiving the second frequency version of the first signal, a second input for receiving the second frequency version of the second signal, and a plurality of outputs.

4. The translational switch system of claim 3, wherein at least one of the first or second output switches includes an AGC block coupled to a respective signal bus line, each AGC block operable to control the level of the signal supplied to said respective bus lines.

5. The translation switch system of claim 1, wherein the first translational switch includes an AGC circuit operable to receive and perform automatic gain control on at least one of the first input signals.

6. The translation switch system of claim 5 further comprising a variable attenuator coupled to, and located in the signal path ahead of the AGC circuit, the variable attenuator controllable by the AGC circuit to set the input signal level of the one or more first input signals supplied to the first translational switch.

7. The translation switch system of claim 1, wherein the first translational switch includes an AGC circuit operable to receive and perform automatic gain control on at least one of the first or second frequency versions of the first input signals.

8. The translational switch system of claim 1, wherein the electrical length of each of the first and second signal bus lines is less than one quarter wavelength of the highest frequency signal propagated there along.

9. The translational switch system of claim 8, wherein each of the first and second signal bus lines are terminated in a high impedance.

10. The translational switch system of claim 1, wherein the electrical length of the connection between the first signal bus line and the first translational switch and between the first signal bus line and the second translational switch is less than one quarter wavelength of the highest frequency signal propagated there along, and wherein the electrical length of the connection between the second signal bus line and the first translational switch and between the second signal bus line and the second translational switch is less than one quarter wavelength of the highest frequency signal propagated there along.

11. The translational switch system of claim 9, wherein the first signal bus line exhibits a characteristic impedance, and wherein the first signal bus line is terminated by a load having an impedance which substantially matches the characteristic impedance of the first signal bus line, and wherein the second signal bus line exhibits a characteristic impedance, and wherein the second signal bus line is terminated by a load having an impedance which substantially matches the characteristic impedance of the second signal bus line.

12. The translational switch system of claim 1, wherein in the second translational switch, the first output is included within a first plurality of outputs, and the second output is included within a second plurality of outputs, the second translational switch configured to switchably output a first frequency version of the second input signal to any of the first plurality of outputs, and to switchably output a second frequency version of the second input signal to any of the second plurality of outputs.

13. The translational switch system of claim 12, wherein the signal bus further comprises:

a third bus line coupled to a second one of the first plurality of outputs of the first translational switch, and to a second one of the first plurality of outputs of the second translational switch; and a fourth bus line coupled to a second one of the second plurality of outputs of the first translational switch and to a second one of the second plurality of outputs of the second translational switch.

14. The translational switch system of claim 13, wherein the first and third bus lines are each operable to support the propagation of the first frequency version of the first or second input signals there along;

wherein the second and fourth bus lines are each operable to support the propagation of the second frequency version of the first or second input signals there along; and wherein the first and third bus lines are interleaved with the second and fourth bus lines.

15. The translational switch system of claim 12, wherein the second translational switch is configured to switchably output on the first plurality of outputs either a first frequency version of any of the second input signals, or a null output signal, the second translational switch further configured to switchably output on the second plurality of outputs either a second frequency version of any one of the second input signals, or a null output signal.

16. The translational switch system of claim 12, wherein the second input signal comprises a plurality of signals including at least a first signal and a second signal, and wherein the second translational switch has a first output switch having a first input for receiving the first frequency version of the first signal, a second input for receiving the first frequency version of the second signal, and a plurality of outputs; and a second output switch, the second output switch having a first input for receiving the second frequency version of the first signal, a second input for receiving the second frequency version of the second signal, and a plurality of outputs.

17. The translational switch system of claim 12, wherein each of the first and second output switches of each of the first and second translational switches comprises a discrete circuit.

18. The translation switch system of claim 12, wherein the second translational switch includes an AGC circuit coupled to receive and perform automatic gain control on at least one of the second input signals.

19. The translation switch system of claim 12, wherein the second translational switch includes an AGC circuit coupled to receive and perform automatic gain control on at least one of the first or second frequency versions of the second input signals.

20. The translational switch system of claim 1, further comprising a third translational switch having one or more inputs configured to receive a respective one or more third input signals, a first output, and a second output, the third translational switch configured to switchably output a first frequency version of the third input signal to the first output, and to switchably output a second frequency version of the third input signal to the second output.

21. The translational switch system of claim 20, wherein the signal bus further comprises:

a third bus line coupled to a second one of the first plurality of outputs of the first translational switch, and to the first output of the third translational switch; and a fourth bus line coupled to a second one of the second plurality of outputs of the first translational switch and to the second output of the third translational switch.

22. The translational switch system of claim 21, wherein the first and third bus lines are each operable to support the propagation of the first frequency version of the first or second input signals there along;

wherein the second and fourth bus lines are each operable to support the propagation of the second frequency version of the first or second input signals there along; and wherein the first and third bus lines are interleaved with the second and fourth bus lines.

23. A system operable to construct a composite signal, the system comprising:

a translational switching system as claimed in claim 1; and a signal combiner having a first input coupled to the first signal bus line, a second input coupled to the second bus line, and an output for providing a composite output signal.

24. A system operable to construct a composite signal, the system comprising:

a first receive module for coupling one or more first input signals to the first translational switch;

a second receive module for coupling one or more second input signal to the first translational switch;

a translational switching system as claimed in claim 1;

a first filter having an input coupled to the first bus line, and an output;

a second filter having an input coupled to the second bus line, and an output; and a signal combiner having a first input coupled to the first filter output, a second input coupled to the second filter output, and an output for providing a composite output signal.

* * * * *